US010008339B2

(12) United States Patent
Mirvakili et al.

(10) Patent No.: US 10,008,339 B2
(45) Date of Patent: Jun. 26, 2018

(54) HIGH-PERFORMANCE SUPERCAPACITORS BASED ON METAL NANOWIRE YARNS

(71) Applicant: Massachusetts Institute of Technology, Cambridge, MA (US)

(72) Inventors: Seyed M. Mirvakili, Vancouver (CA); Ian W. Hunter, Lincoln, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days. days.

(21) Appl. No.: 15/830,566

(22) Filed: Dec. 4, 2017

(65) Prior Publication Data

US 2018/0090283 A1   Mar. 29, 2018

Related U.S. Application Data

(63) Continuation of application No. 14/839,499, filed on Aug. 28, 2015, now Pat. No. 9,865,404.

(Continued)

(51) Int. Cl.
*H01G 11/78* (2013.01)
*H01G 11/26* (2013.01)
(Continued)

(52) U.S. Cl.
CPC .............. *H01G 11/78* (2013.01); *H01G 9/048* (2013.01); *H01G 11/26* (2013.01); *H01G 11/30* (2013.01); *H01G 11/52* (2013.01); *H01G 11/56* (2013.01); *H01G 11/58* (2013.01); *H01G 11/86* (2013.01); *H01G 2009/05* (2013.01); *Y02E 60/13* (2013.01)

(58) Field of Classification Search
None
See application file for complete search history.

(56) References Cited

U.S. PATENT DOCUMENTS

| 8,787,001 B2 * | 7/2014 | Fleischer | H01G 11/36 361/502 |
| 2011/0097624 A1 | 4/2011 | Bhatt et al. | |

(Continued)

OTHER PUBLICATIONS

International Search Report and Written Opinion in PCT/US2015/047520 dated Jan. 25, 2016, 20 pages.

(Continued)

*Primary Examiner* — Dion R Ferguson
(74) *Attorney, Agent, or Firm* — Goodwin Procter LLP

(57) ABSTRACT

An energy-storage device is formed from a first and a second yarn, each yarn including a plurality of nanowires including aluminum and/or a transition metal. An anode pad is in contact with the first yarn and a cathode pad is in contact with the second yarn. Alternatively, first and second metallic electrodes may be disposed substantially in parallel, with pluralities of nanowires including aluminum and/or a transition metal extending therefrom. In another embodiment, a supercapacitor may include a niobium yarn including a plurality of niobium nanowires. Each niobium nanowire may include at least (i) a first section comprising at least one of unoxidized niobium and niobium oxide; (ii) a second section comprises a niobium pentoxide layer; and (iii) a third section comprises a layer formed by dipping the niobium nanowire in at least one of a conductive polymer and a liquid metal.

8 Claims, 26 Drawing Sheets

Related U.S. Application Data

(60) Provisional application No. 62/043,490, filed on Aug. 29, 2014.

(51) Int. Cl.
*H01G 9/048* (2006.01)
*H01G 11/86* (2013.01)
*H01G 11/58* (2013.01)
*H01G 11/56* (2013.01)
*H01G 11/52* (2013.01)
*H01G 11/30* (2013.01)
*H01G 9/04* (2006.01)

(56) References Cited

U.S. PATENT DOCUMENTS

| | | |
|---|---|---|
| 2011/0170236 A1 | 7/2011 | Young |
| 2012/0100203 A1 | 4/2012 | Fang |
| 2013/0217289 A1 | 8/2013 | Nayfeh |
| 2014/0098462 A1* | 4/2014 | Farmer .............. H01G 11/28 361/502 |

OTHER PUBLICATIONS

Jing Ren et al., "Twisting Carbon Nanotube Fibers for Both Wire-Shaped Micro-Supercapacitor and Micro-Battery", Adv. Mater. 2013, pp. 1155-1159.
Mirvakili et al., "Niobium Nanowire Yarns and their Application as Artificial Muscles", Adv. Funct. Mater, vol. 23, 2013, pp. 4311-4316.
Aboutalebi, et al., "High-Performance Multifunctional Graphene Yarns: Toward Wearable All-Carbon Energy Storage Textiles," ACSNANO, vol. 8, No. 3, (2014), pp. 2456-2466.
Chen, et al., "significantly enhanced robustness and electrochemical performance of flexible carbon nanotube-based supercapacitors by electrodepositing polypyrrole," Journal of Power Sources, vol. 287, (2015), pp. 68-74.
Choi, et al., "Flexible Supercapacitor Made of Carbon Nanotube Yarn with Internal Pores," Advanced Materials, vol. 26, (2014), pp. 2059-2065.
Dong, et al., "Facile Fabrication of Light, Flexible and Multifunctional Graphene Fibers," Advance Materials, vol. 24, (2012), pp. 1856-1861.
El-Kady, et al., "Laser Scribing of High-Performance and Flexible Graphene-Based Electrochemical Capacitors," Science, vol. 335, (Mar. 16, 2012), pp. 1326-1330.
Fekri, et al., "Influence of porosity on charging speed of polypyrrole," Synthetic Metals, vol. 187, (2014), pp. 145-151.
Fu, et al., "Integrated power fiber for energy conversion and storage," Energy & Environmental Science, (2013), pp. 805-812.
Futaba, et al., "Shape-engineerable and highly densely packed single-walled carbon nanotubes and their application as supercapacitor electrodes," Nature Materials, vol. 5, (Dec. 2006), pp. 987-994.
Gogotsi, et al., "True Performance Metrics in Electrochemical Energy Storage," Science, vol. 334, Nov. 18, 2011, 4 pages.
Jalili, et al., "Scalable One-Step Wet-Spinning of Graphene Fibers and Yarns from Liquid Crystalline Dispersions of Graphene Oxide: Towards Multifunctional Textiles," Advance Functional Materials, vol. 23, (2013), pp. 5345-5354.
Kim, et al., "High-Performance Supercapacitors Based on Poly(ionic liquid)-Modified Graphene Electrodes," ACSNANO, vol. 5, No. 1, (2011), pp. 436-442.
Kou et al.,"Coaxial wet-spun yarn supercapacitors for high-energy density and safe wearable electronics," Nature Communications, (2014), pp. 1-10.
Lee, et al., "Ultrafast charge and discharge biscrolled yarn supercapcitors for textiles and microdevices," Nature Communications, (2013), pp. 1-8.
Liu, et al., "Cable-Type Supercapacitors of Three-dimensional Cotton Thread Based Multi-Grade Nanostructures for Wearable Energy Storage," Advanced Materials, vol. 25, (2013), pp. 4925-4931.
Meng, et al., "All-Graphene Core-Sheath Microfibers for All-Solid-State, Stretchable Fibriform Supercapacitors and Wearable Electronic Textiles," Advanced Materials, vol. 25, (2013), pp. 2326-2331.
Mirvakili, et al., "High-Performance Supercapacitors from Niobium Nanowire Yarns," ACS Publications, (Apr. 2015), 7 pages.
Mirvakili, et al., "Superhydrophobic Lignocellulosic Wood Fiber/Mineral Networks," Applied Materials & Interfaces, vol. 5, (2013), pp. 9057-9066.
Mirvakili, et al., Supporting Information for "High-Performance Supercapacitors from Niobium Nanowire Yarns," (2015), 17 pages.
Nyholm, et al., "Toward Flexible Polymer and Paper-Based Energy Storage Devices," Advanced Materials, vol. 23, (2011), pp. 3751-3769.
Olivares-Navarrete, et al., "Biocompatibility of Niobium Coatings," Coatings, (2011), pp. 72-87.
Pech, et al., "Ultrahigh-power micrometer-sized supercapacitors based on onion-like carbon," Nature Nantechnology, vol. 5, (Sep. 2010), pp. 651-654.
Ren, et al., "Twisting Carbon Nanotube Fibers for Both Wire-Shaped Micro-Supercapacitor and Micro-Battery," Advanced Materials, vol. 25, (2013), pp. 1155-1159.
van Drunen, et al., "Comprehensive Structural, Surface-Chemical and Electrochemical Characterization of Nickel-Based Metallic Foams," Applied Materials & Interfaces, vol. 5, (2013), pp. 6712-6722.
Wang, et al., "High-Performance Two-Ply Yarn Supercapacitors Based on Carbon Nanotubes and Polyaniline Nanowire Arrays," Advanced Materials, vol. 25, (2013), pp. 1494-1498.
Wu, et al., "Stable Li-ion battery anodes by in-situ polymerization of conducting hydrogel to conformally coat silicon nanoparticles," Nature Communications, 2013, 6 pages.
Xia, et al., "Measurement of the quantum capacitance of graphene," Nature Nanotechnology, vol. 4, (Aug. 2009), pp. 505-509.
Xiao, et al., Fiber-Based All-Solid-State Flexible Supercapacitors for Self-Powered Systems, ACSNANO, vol. 6, No. 10, (2012), pp. 9200-9206.
Xu, et al., "Ultrastrong Fibers Assembled from Giant graphene Oxide Sheets," Advanced Materials, vol. 25, (2013), pp. 188-193.
Yang, et al., "Flexible solid-state electrochemical supercapacitors," ScienceDirect, (2014), vol. 8, pp. 274-290.
Yang, et al., "Hydrogenated ZnO Core-Shell Nanocables for Flexible Supercapacitors and Self-Powered Systems," ACSNANO, vol. 7, No. 3, (2013), pp. 2617-2626.
Yang, et al., "Liquid-Mediated Dense Integration of Graphene Materials for Compact Capacitive Energy Storage," Science, vol. 341, Aug. 2, 2013, pp. 534-537.
Yu, et al., "Scalable synthesis of hierarchically structured carbon nanotube-graphene fibres for capacitive energy storage," Nature Nanotechnology, vol. 9, (Jul. 2014), pp. 555-561.
Zhang, et al., "Multifunctional Carbon Nanotube Yarns by Downsizing an Ancient Technology," Science, vol. 306, (Nov. 19, 2014), pp. 1358-1361.

* cited by examiner

FIG. 4A 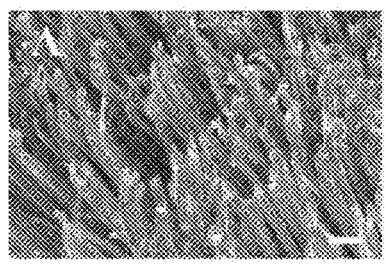 FIG. 4B 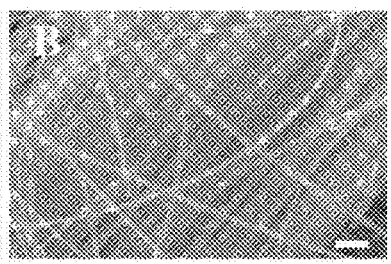
FIG. 4C 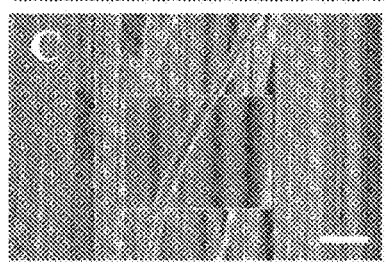 FIG. 4D 
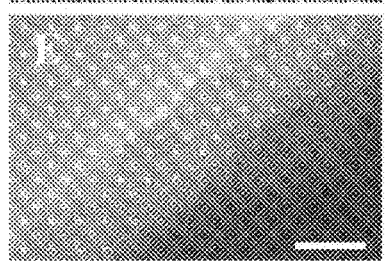 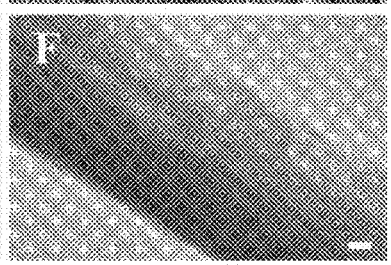
FIG. 4E FIG. 4F

SIDE VIEW

TOP VIEW

TOP VIEW

SIDE VIEW

HIGH-PERFORMANCE SUPERCAPACITORS BASED ON METAL NANOWIRE YARNS

CROSS REFERENCE TO RELATED APPLICATIONS

This application is a continuation of U.S. patent application Ser. No. 14/839,499, filed Aug. 28, 2015, which claims priority to and the benefit of, U.S. Provisional Patent Application No. 62/043,490, entitled "Flexible, Sewable, and Tunable Energy Storage Device," which was filed on Aug. 29, 2014; both applications are hereby incorporated by reference in their entireties.

FIELD OF THE INVENTION

This disclosure generally relates to energy storage devices and, in particular, to supercapacitors made using yarns of transition-metal nanowires.

BACKGROUND

Conventional capacitors such as parallel-plate capacitors and electrolytic capacitors typically have low capacitance values in the range of 1 pF to about 1 mF. These capacitors also have relatively low energy density of, e.g., about 70 $mWKg^{-1}$, making them generally unsuitable for use in wearable computing, e.g., via integration of these capacitors with clothing and apparel. In batteries, electrode surface and bulk material of the battery are involved in the charge storage mechanism, which generally increases the energy density of batteries relative to the energy density of conventional capacitors. The power density of a battery, however, is relatively low because of the charge storage mechanism of batteries is relatively slow compared to the charge storage mechanism of a conventional capacitor. Specifically, in contrast to batteries, charge storage in capacitors occurs at the surface, either in the electric double layer or redox states, and the bulk material of the capacitor does not contribute significantly to the charge storage which can make the charge storage faster compared to batteries. While this makes the energy density of a capacitor lower compared to that of batteries, the power density is relatively greater.

Carbon nanotube (CNT) and/or graphene based energy storage devices (generally called supercapacitors) typically have a high gravimetric capacitance of, e.g., about 120 F/g. Miniature energy storage devices made using CNT and/or graphene in forms such as nanotubes, yarns, forests, etc., can therefore offer both high energy densities and high power densities. The large ion accessible surface area of CNTs and graphene sheets formed as yarns, forests, and films can enable miniature high performance supercapacitors with power densities exceeding those of electrolytics, while achieving energy densities comparable to those of batteries. Capacitance and energy density can be enhanced by depositing highly pseudocapacitive materials such as conductive polymers. Yarns formed from carbon nanotubes were proposed for use in wearable supercapacitors.

These CNT based yarns, however, typically have low tensile strength e.g., of about 0.6-1.1 GPa, and CNT is generally not biocompatible. Therefore, CNT yarn based supercapacitors are not particularly well suited for making wearable supercapacitors and for integration with clothing and apparel. CNTs also typically do not withstand high temperatures, e.g., temperatures above 400-500° C., or above 2000° C. in vacuum. Therefore, many CNT-based capacitors are also not suitable for operation in high-temperature environments, where the temperature can exceed 1000° C., such as in various sensors used in drilling for oil.

SUMMARY

Various supercapacitor structures described herein have high volumetric capacitance and high tensile strength. These supercapacitor structures typically have a relatively low resistance, or high conductivity relative to carbon-based devices, and they are generally biocompatible. This is achieved, at least in part, by constructing supercapacitor structures using yarns of nanowires of transition and other metals such as niobium, tantalum, vanadium, molybdenum, copper, nickel, iron, platinum, gold, silver, zinc, and aluminum. Additional optional materials such as separators, electrolytes, metallic electrodes, etc., are used in various supercapacitor structures to enhance properties thereof, such as volumetric capacitance, low surface resistance, etc.

Accordingly, in one aspect a supercapacitor includes a first yarn and a second yarn. Each yarn includes several nanowires that include aluminum and/or a transition metal. An anode pad is in contact with the first yarn, and a cathode pad is in contact with the second yarn. The transition metal can be any one of or a combination of two or more of niobium, tantalum, vanadium, molybdenum, copper, nickel, iron, platinum, gold, silver, and zinc.

The first and second yarns may include the same material, i.e., aluminum and/or a transition metal. In other embodiments, the first and second yarns may include different materials.

In some embodiments, the diameter of each nanowire is selected from a range of 20 nm to 200 nm, and a length of the first yarn is selected from a range of 1 μm to 100 m. The diameter of the first yarn may be selected from a range of 10 μm to 1 mm.

In some embodiments, each yarn is coated with a flexible, solid electrolyte. The flexible, solid electrolyte may include polyvinyl alcohol (PVA) and sulfuric acid. In general, the flexible, solid electrolyte may be formed using an ionic liquid and inert nanoparticles such as fused silica nanoparticles. The first yarn and the second yarn may be twisted together forming a twisted pair of yarns. The capacitance of the supercapacitor may vary substantially linearly according to a length of the twisted pair of yarns.

In some embodiments, the first or the second yarn, or both yarns may be coated with a pseudocapacitive material. The pseudocapacitive material may include a conductive polymer, and the conductive polymer may include one or more of poly(3,4-ethylenedioxythiophene) (PEDOT), poly pyrrole, and poly aniline.

In some embodiments, the supercapacitor of claim 1, further includes a sealed enclosure encapsulating the first and second yarns. The sealed enclosure may include a liquid electrolyte and an ionically conductive separator disposed within the sealed enclosure and between the first and second yarns. The liquid electrolyte can be an aqueous electrolyte, an organic electrolyte, an ionic electrolyte, or a molten salt. In some embodiments, the liquid electrolyte is sulfuric acid, tetrabutylammonium hexafluorophosphate (TBAPF6) in acetonitrile, or tetraethylammonium tetrafluoroborate in propylene carbonate. The separator may include one or more of: (i) glass fibers, (ii) a perfluorosulfonic acid polymer, (iii) a millipore membrane, and (iv) a cellulosic-based sheet. The cellulosic-based sheet may include micron-sized cellulosic wood pulp fibers.

In some embodiments, the volumetric capacitance of the supercapacitor is at least 5 $F/cm^3$. The operating voltage of the supercapacitor may be at least 2.5 V, and the total capacitance of the supercapacitor may be at least 10 mF. In some embodiments, the conductivity of the supercapacitor is at least $3\times10^4$ S/m. The energy density of the supercapacitor may be at least 5 MJ/m$^3$. The peak power density of the supercapacitor may be at least 22 MW/m$^3$.

In another aspect, a supercapacitor includes a first metallic electrode including a metal, and a first group of nanowires including aluminum and/or a transition metal. The first group of nanowires extends from the first metallic electrode. The supercapacitor also include a second metallic electrode including the metal and disposed substantially in parallel to the first metallic electrode. A second group of nanowires also includes aluminum and/or the transition metal and extends from the second metallic electrode. The transition metal can be any one of or a combination of two or more of niobium, tantalum, vanadium, molybdenum, copper, nickel, iron, platinum, gold, silver, and zinc. The first metallic electrode may include one or more of gold, platinum, silver, copper, and aluminum.

In some embodiments, the first and second metallic electrodes may include the same metal. In other embodiments, the first and second metallic electrodes may include different metals. The first and second groups of nanowires may include the same material, i.e., aluminum and/or a transition metal. In other embodiments, the first and second groups of nanowires include different materials.

In some embodiments, the supercapacitor further includes an electrolyte, and the metal and the electrolyte are selected to be compatible with each other. The area of the first metallic electrode may be selected from a range of 6 mm$^2$ to 600 mm$^2$. The diameter of each nanowire may be selected from a range of 20 nm to 200 nm, and the length of each nanowire may selected from a range of 1 µm to 1,000 µm. In some embodiments, between 10% and 40% volumetric space of the first metallic electrode includes or is occupied by the first group of nanowires.

The first, second, or both groups of nanowires may be coated with a pseudocapacitive material. The pseudocapacitive material may include a conductive polymer, and the conductive polymer may include one or more of poly(3,4-ethylenedioxythiophene) (PEDOT), poly pyrrole, and poly aniline. In some embodiments, the supercapacitor further includes an ionically conductive separator disposed between the first group of nanowires and the second group of nanowires. The ionically conductive separator may include one or more of: (i) glass fibers, (ii) a perfluorosulfonic acid polymer, (iii) a millipore membrane, and (iv) one or more cellulosic-based sheets. The cellulosic-based sheet or sheets may include micron-sized cellulosic wood pulp fibers. In some embodiments, the resistance of the first group of nanowires is less than $1.5\times10^{-4}$ ohms.

In another aspect, a supercapacitor includes a niobium yarn including several niobium nanowires. Each niobium nanowire includes at least three sections. The first section includes unoxidized niobium, niobium oxide, or both. The second section includes a niobium pentoxide layer, and the third section includes a layer formed by dipping the niobium nanowire, after the niobium pentoxide layer is formed, in a conductive polymer, a liquid metal, or a combination thereof. The liquid metal may include one or more of indium, gallium, and tin.

In some embodiments, the diameter of the niobium nanowire is selected from a range of 20 nm to 200 nm, and the thickness of the second section is selected from a range of 7.5 nm up to 95 nm. The diameter of the niobium nanowire and the thickness of the second section may be selected according to a specified operating voltage.

In another aspect, a method of constructing a supercapacitor includes the steps of selecting and grouping together a first collection or set of nanowires including aluminum and/or a transition metal, to form a first yarn. The method also includes selecting and grouping a second collection or set of nanowires including aluminum and/or the transition metal, to form a second yarn. In addition, the method includes forming an anode pad in contact with the first yarn, and forming a cathode pad in contact with the second yarn. The transition metal can be any one of or a combination of two or more of niobium, tantalum, vanadium, molybdenum, copper, nickel, iron, platinum, gold, silver, and zinc.

In some embodiments, the nanowires of the first yarn includes the same material as the nanowires of the second yarn. In other embodiments, the nanowires of the first and second yarns include different materials.

In some embodiments, selecting the first set of nanowires includes selecting a diameter of each nanowire from a range of 20 nm to 200 nm, and selecting a length of the nanowires from a range of 1 µm to 100 m. Grouping the first set of nanowires into the first yarn may include selecting a diameter of the first yarn from a range of 10 µm to 1 mm.

In some embodiments, the method also includes coating each yarn with a flexible, solid electrolyte. The method may include forming the flexible, solid electrolyte using PVA and sulfuric acid. The flexible, solid electrolyte may also be formed using an ionic liquid and inert nanoparticles. The method may further include twisting the first yarn and the second yarn together to form a twisted pair of yarns. In some embodiments, the method additionally includes coating the first yarn, the second yarn, or both yarns with a pseudocapacitive material. The pseudocapacitive material may include a conductive polymer, and the conductive polymer can be one or more of poly(3,4-ethylenedioxythiophene) (PEDOT), poly pyrrole, and poly aniline.

In some embodiments, the method includes disposing the first and second yarns within an enclosure, and disposing an ionically conductive separator within the enclosure and between the first and second yarns. The method may also include disposing a liquid electrolyte within the enclosure, and sealing the enclosure. The liquid electrolyte can be an aqueous electrolyte, an organic electrolyte, an ionic electrolyte, or a molten salt. In some embodiments, the liquid electrolyte can be sulfuric acid, tetrabutylammonium hexafluorophosphate (TBAPF6) in acetonitrile, or tetraethylammonium tetrafluoroborate in propylene carbonate. The separator may include one or more of: (i) glass fibers, (ii) a perfluorosulfonic acid polymer, (iii) a millipore membrane, and (iv) one or more cellulosic-based sheets. The cellulosic-based sheet or sheets may include micron-sized cellulosic wood pulp fibers.

In another aspect, a method of constructing a supercapacitor includes the steps of forming a first metallic electrode having a metal on a first group of nanowires including aluminum and/or a transition metal. The method also includes forming a second metallic electrode having the metal on a second group of nanowires including aluminum and/or the transition metal, and disposing the second metallic electrode substantially in parallel to the first metallic electrode. The transition metal can be any one of or a combination of two or more of niobium, tantalum, vanadium, molybdenum, copper, nickel, iron, platinum, gold, silver, and zinc. The first and second metallic electrodes may include one or more of gold, platinum, silver, copper, and aluminum.

In some embodiments, the first and second metallic electrodes may include the same metal. In other embodiments, the first and second metallic electrodes may include different metals. The first and second groups of nanowires may include the same material, i.e., aluminum and/or a transition metal. In other embodiments, the first and second groups of nanowires include different materials.

In some embodiments, the method further includes disposing an electrolyte on the first group of nanowires, and selecting the metal of the first metallic electrode and the electrolyte such that the metal and the electrolyte are compatible with each other. Forming the first metallic electrode on the first group of nanowires may include electrochemical plating. In some embodiments, forming the first metallic electrode on the first group of nanowires includes consuming between 10% and 40% volumetric space of the first metallic electrode by the first group of nanowires.

The method may further include coating the first, second, or both groups of nanowires with a pseudocapacitive material. The pseudocapacitive material may include a conductive polymer, and the conductive polymer may include one or more of poly(3,4-ethylenedioxythiophene) (PEDOT), poly pyrrole, and poly aniline. In some embodiments, the method further includes disposing an ionically conductive separator between the first group of nanowires and the second group of nanowires. The ionically conductive separator may include one or more of: (i) glass fibers, (ii) a perfluorosulfonic acid polymer, (iii) a millipore membrane, and (iv) a cellulosic-based sheet or sheet. The cellulosic-based sheet or sheets may include micron-sized cellulosic wood pulp fibers.

In another aspect, a method of constructing a supercapacitor includes the steps of, for each one of several niobium nanowires, oxidizing a portion of a niobium nanowire, thereby forming a dielectric layer of niobium pentoxide disposed on an anode portion of the niobium nanowire. The anode portion may include unoxidized niobium, and the method may include optionally oxidizing at least a part of the anode portion, forming a layer of niobium oxide which is separate from the dielectric layer of niobium pentoxide. In addition, the method includes coating each niobium wire, having the anode and the dielectric layer, with one or more of a conductive polymer and a liquid metal, thereby forming a cathode. The method further includes forming a niobium yarn by grouping together the niobium wires, each wire having an anode, a dielectric layer, and a cathode, to form the supercapacitor including the niobium yarn.

The liquid metal may include one or more of indium, gallium, and tin. In some embodiments, a diameter of each niobium nanowire is selected from a range of 20 nm to 250 nm, and (ii) oxidizing is controlled such that a thickness of the dielectric layer is within a range of 7.5 nm up to 100 nm. The method may further include selecting a diameter of each niobium nanowire and a thickness of each dielectric layer to facilitate operation of the supercapacitor at a specified operating voltage.

The gravimetric capacitance of CNT and/or graphene based energy storage devices is generally higher than that of devices based on aluminum and/or transition metals. As such, devices made using aluminum and/or transition metal yarns may be less preferable than CNT/graphene based devices when light-weight energy storage devices are needed. The use of yarns of aluminum or a transition metal, however, allows many of the supercapacitor structures described herein to be flexible, and sewable, because the tensile strength of these supercapacitors is generally greater than that of CNT/graphene based devices. Moreover, the volumetric capacitance of aluminum or transition-metal-yarn based supercapacitors is generally greater than that of CNT/graphene based supercapacitors. The aluminum or transition-metal-yarn based supercapacitors also have low resistance relative to CNT or graphene-based devices having a similar capacitance. Therefore, the various supercapacitors described herein can be integrated with clothing and apparel, and can be generally used in wearable computing. Moreover, these supercapacitor structures can also withstand temperatures of up to about 2600° C. if encapsulation of the supercapacitor substantially prevents oxidation thereof and, as such, they can be employed in high-temperature environments.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 4A-4D are SEM images of niobium nanowires, according to one embodiment;

FIGS. 4E and 4F are TEM images corresponding to the nanowires shown in FIGS. 4A-4D;

DETAILED DESCRIPTION

In various embodiments described below, niobium nanowires (Nb NW) generally represent nanowires including aluminum and/or various transition metals such as tantalum, vanadium, molybdenum, copper, nickel, iron, platinum, gold, silver, and zinc. Niobium is used as an example for the sake of convenience. It should be understood that the techniques, structures, and manufacturing processes described herein are generally applicable to supercapacitor structures based on nanowires of other transition metals.

Lack of biocompatibility of carbon nanoparticles limits their application in biomedical devices and implants. Niobium, which is more abundant than molybdenum, silver and tin, and widely used in steel alloys, is a highly chemically stable, hypoallergenic, biocompatible, and bioinert material, which makes it appropriate for applications in jewelry, biomedical, and corrosive resistant coatings for surgical tools. Volumetric capacitance of bare niobium nanowire yarns is measured to be three times higher than that of carbon nanotube yarns. This combination of high electrical conductivity and high volumetric capacitance makes possible the high power and energy densities for the bare niobium nanowire (Nb NW) yarns. Although energy density is lower than in some graphene and activated carbon electrodes, these materials cannot achieve the same power density without the use of a metal backing layer, which would make them suitable for use in wearable devices.

Electrochemical properties of Nb NW yarns were measured and their performance as supercapacitor electrodes was evaluated. Electrochemical characteristics of bare Nb NW yarns are reported in various electrolytes. A highly ionically conductive cellulose-based separator was designed for use in some embodiments of the supercapacitor. To boost the performance, conducting polymer Poly (3,4-ethylenedioxythiophene) (PEDOT) may be deposited on the electrodes. For the purpose of illustration, a bare Nb NW based supercapacitor is shown to harvest energy from a solar cell and then to energize a temperature sensor and an FM transmitter.

Figures 1A, 1B, 1C, 1D, 1E, 1F:
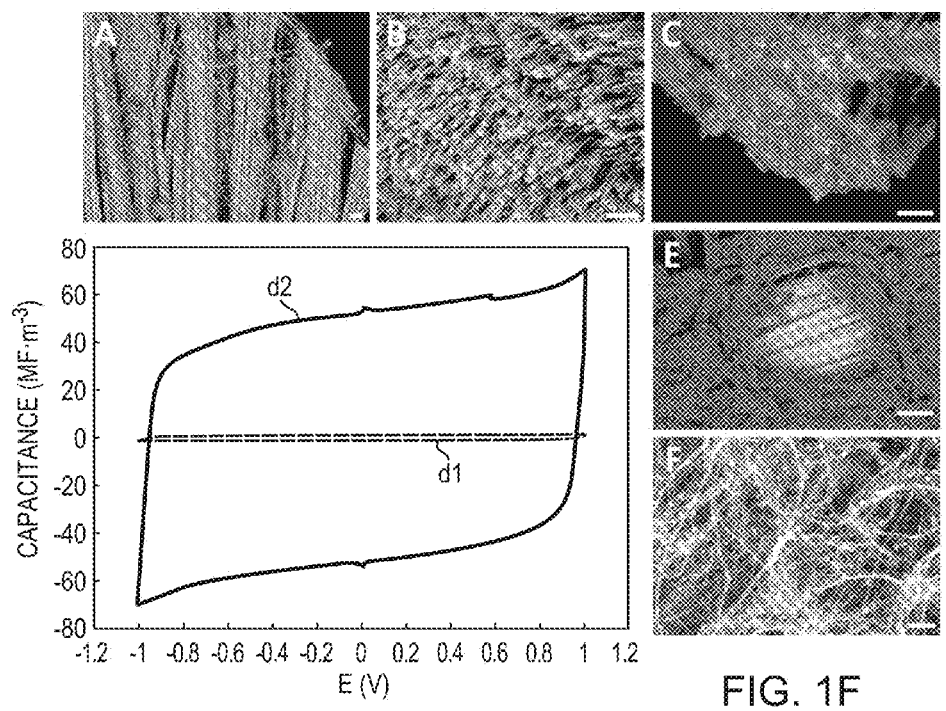
FIGS. 1A-1C show scanning electron microscopy (SEM) images obtained during the formation of a niobium nanowire yarn, according to one embodiment.
FIG. 1D shows a capacitance-voltage (CV) plot of the yarns depicted in FIGS. 1B and 1C.
FIGS. 1E and 1F are SEM images of separators that may be used in supercapacitors according to different embodiments.
Figure 2:
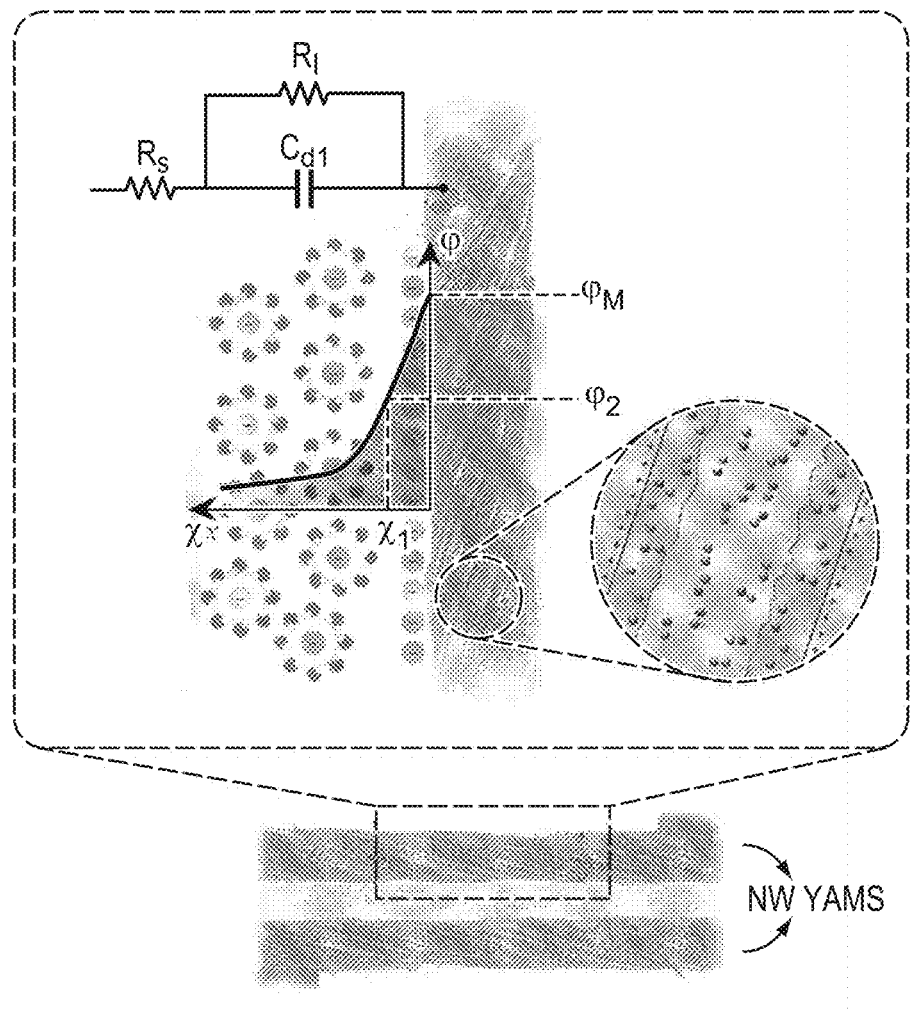
FIG. 2 schematically depicts a charge storage mechanism of an Nb NW yarn based supercapacitor cell.

Niobium nanowires, depicted in FIGS. 1A and 1B, are twisted into yarns as shown in FIG. 2, forming high internal surface area materials (e.g., 100 times that of Ni foam). The individual strands Nb NW are about 140 nm in diameter. FIG. 1A is an SEM image of a niobium nanowire yarn having un-etched copper micro particles that may be removed during the copper etching process. FIGS. 1B and 1C show SEM images of a generally copper-free niobium yarn before and after PEDOT deposition, respectively. In FIG. 1D, curve $d_1$ shows an increase in volumetric capacitance (with unit of $MF·m^{-3}$ or $F·cm^{-3}$) of one electrode by depositing PEDOT relative to that of shown by curve $d_2$ on bare Nb nanowires at scan rate of 500 $mV·s^{-1}$. The CV was determined from −1 V to 1 V demonstrating that the CV is symmetric. The glitches at the zero potential are due to the artifact of the measurement device. FIG. 1E depicts thin paper (Kim wipe) as a separator, and FIG. 1F shows high performance separators prepared by cellulosic wood pulp fibers of different sizes. Scale bars for all SEM images are 5 μm except for FIG. 1E, which is 20 μm. To estimate the specific capacitance expected of the Nb NW yarns, the capacitance per area ($C_A$) of bulk niobium was measured, and found to be 0.52 $F·m^{-2}$ (52 $μF·cm^{-2}$). Using the value for $C_A$ and the 140 nm average diameter of the Nb NW yarns, an estimated specific volumetric capacitance limit of $1.36×10^7$ $F·m^{-3}$ (13.6 $F·cm^{-3}$) and gravimetric capacitance limit of 1.5 $F·g^{-1}$ was found which is lower than the gravimetric capacitance of carbon-based materials.

To this end, specific gravimetric and volumetric capacitance limits are estimated from the measured capacitance per area of bulk niobium (0.52 $F·m^{-2}$) assuming all the nanowires have circular cross-section:

$$C_V^o = C_A 2/r = 1.5 \times 10^7 \text{ F·m}^{-3},$$

where r is the average radius of the Nb nanowires (70 nm). Including an estimated packing density of the nanowires the volumetric capacitance can be found as:

$$C_V = 1.5 \times 10^7 \frac{\pi}{2\sqrt{3}} \approx 1.36 \times 10^7 \text{ F·m}^{-3}.$$

Figure 3:
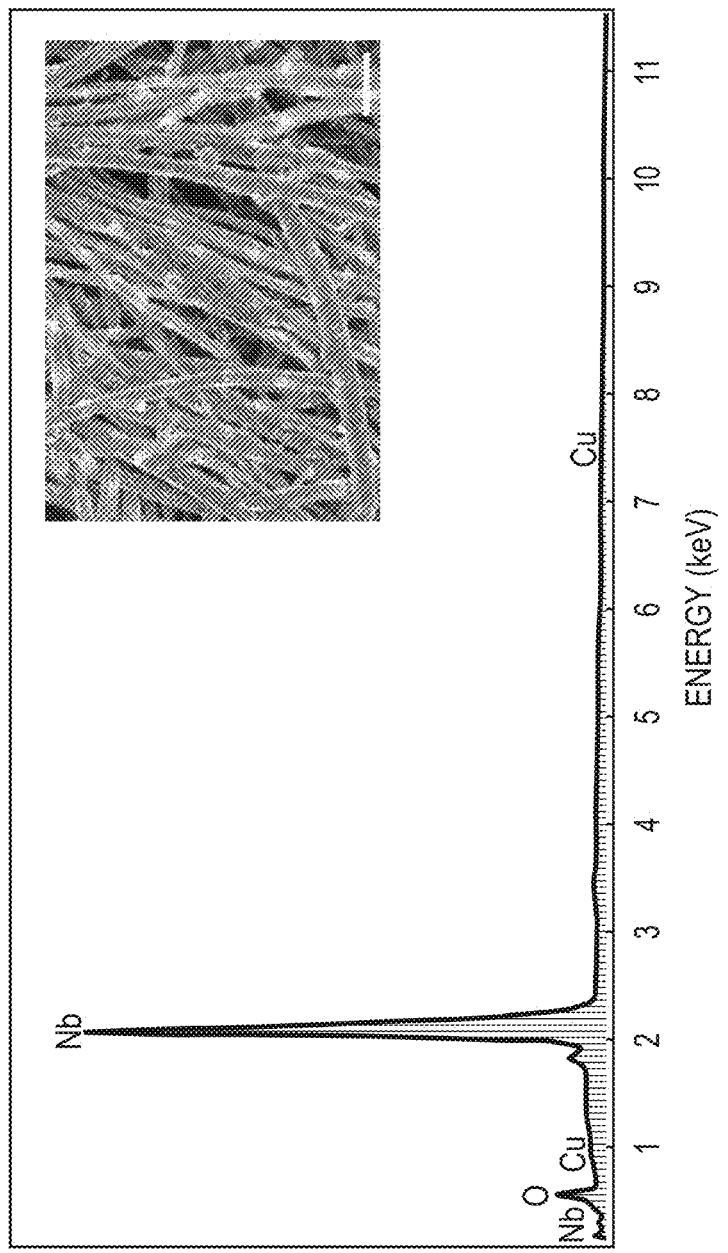
FIG. 3 shows energy-dispersive X-ray spectroscopy (EDX) of an Nb NW yarn according to one embodiment.

With reference to FIGS. 3 and 4, EDX analysis followed by SEM imaging shows the etched samples are pure niobium with almost no copper traces on them. With reference to FIG. 3 EDX analysis of fully etched niobium nanowire yarns shows that almost no copper is left on the samples. The scale bar is 500 nm. The SEM images depicted in FIGS. 4A and 4D were taken during the etching process. FIG. 4A shows that individual niobium nanowires are still linked together by copper. FIGS. 4E and 4F are the TEM images of a niobium nanowire. FIG. 4E shows an oxide layer of 4 to 5 nm thickness. The diameter of that nanowire is around 180 nm as shown in FIG. 4F. The scale bar for FIGS. 4A, 4B, and 4D is 2 μm; for FIG. 4C is 1 μm; for FIG. 4E is 5 nm; and for FIG. 4F is 20 nm. The density of bulk niobium was used to find the gravimetric capacitance of the niobium as:

$$C_m = \frac{C_V}{\rho} \approx 1.5 \text{ kF} \cdot \text{kg}^{-1} (\text{F} \cdot \text{g}^{-1}).$$

Capacitances of the Nb NW yarns were measured in aqueous, organic, and ionic liquid electrolytes and are listed in Table 1 below. In particular, sulfuric acid 1M, tetrabutylammonium hexafluorophosphate (TBAPF6) in acetonitrile (0.1M), and tetraethylammonium tetrafluoroborate in propylene carbonate (1M) were used as the aqueous, organic, and ionic liquid electrolytes, respectively. Many other ionic liquids may be used as the electrolyte. The electrodes were rinsed with a solvent and dried after each measurement. Sulfuric acid showed the best performance from a charging rate point of view.

TABLE 1

Comparison of effect of electrolyte on performance of the bare Nb NWs yarns. Two scan rates of 50 mV/s and 500 mV/s scanning from −1 V to 1 V were chosen for this comparison.

|  | Aqueous | Organic | Ionic Liquid |
|---|---|---|---|
| $C_{500}$ (mF) | 10 | 8.2 | 6.4 |
| $C_{50}$ (mF) | 10 | 8.8 | 10 |

The highest capacitances and power densities as shown in Table 1, were achieved in sulfuric acid solution. The experimental values were measured to be $1.1 \times 10^7$ F·m$^{-3}$ (11 F·cm$^{-3}$) and 1.3 kF·kg$^{-1}$ (1.3 F·g$^{-1}$) (for yarns made of nanowires with individual average diameter of 90 nm), which are close to the estimated theoretical limits, are higher than the $0.5 \times 10^7$ F·m$^{-3}$ (5 F·cm$^{-3}$) for carbon nanotube yarns, and close to the value of $1.2 \times 10^7$ F·m$^{-3}$ (12 F·cm$^{-3}$) reported for densely packed single-walled carbon nanotubes in organic electrolyte (i.e., Et$_4$NBF4/propylene carbonate). Using ionic liquids allows for operating voltages of up to 3 V. Capacitors of up to 36 mF can be made with bare niobium nanowires, which is higher than the largest capacitance value of 10 mF made with PEDOT coated carbon nanotube yarns plied with Pt microwire. Although nanotubes have much smaller diameters, their capacitance per area is much smaller, and there is a tendency for bundling to occur, reducing accessible surface area. For example, among carbon-based materials, graphene has the largest double layer capacitance of 0.21 F·m$^{-2}$ (21 µF·cm$^{-2}$) but with total capacitance of 0.065 F·m$^{-2}$ (6.5 µF·cm$^{-2}$), which is almost 10 times lower than that of niobium. This is explained by the fact that although the ion-accessible area is very high for graphene, the quantum capacitance—arising from the low density of states—is small. In various embodiments, the niobium nanowires generally do not suffer from this limitation in part due to their relatively large diameter (about 90-140 nm), and capacitance is thus determined by the double layer.

Conductivity of Nb NW yarns was measured to be $3 \times 10^6$ S·m$^{-1}$ which is 100 times higher than in multiwalled carbon nanotube yarns ($3 \times 10^4$ S·m$^{-1}$). Nb NW yarns were infiltrated with electrodeposited PEDOT, as shown in FIG. 1C. Base Nb NW are depicted in FIG. 5A-F. For a 54 wt. % sample the volumetric capacitance was improved 70 fold as depicted in FIG. 1D, up to $5 \times 10^7$ F·m$^{-3}$ (50 F·cm$^{-3}$). This is explained with reference to FIG. 2, which schematically depicts a cell diagram and a charge storage mechanism of the half-cell. An SEM image of a piece of Nb NW yarn (slightly twisted) represents the working electrode and the separator is shown on the left. A double layer forms at the surface of the yarn very quickly after voltage is applied. The charge then propagates to the internal surface of the yarn. Coating the yarn with PEDOT (as depicted by the magnified circle) increases the charge storage due to the high charge storage density of this conducting polymer, with the backbone of the polymer balancing ion charge. During charge storing, potential drops linearly from the metal/electrolyte interface up to $x_1$ due to the high density of opposite charges accumulated at the interface. Ions also charge the interior surfaces of the niobium yarn. The inset illustrates that the addition of PEDOT to the interior of the nanowire structure can increase capacitance. Electrolyte and PEDOT within the yarn represent positive and negative ions, respectively.

Figure 5:
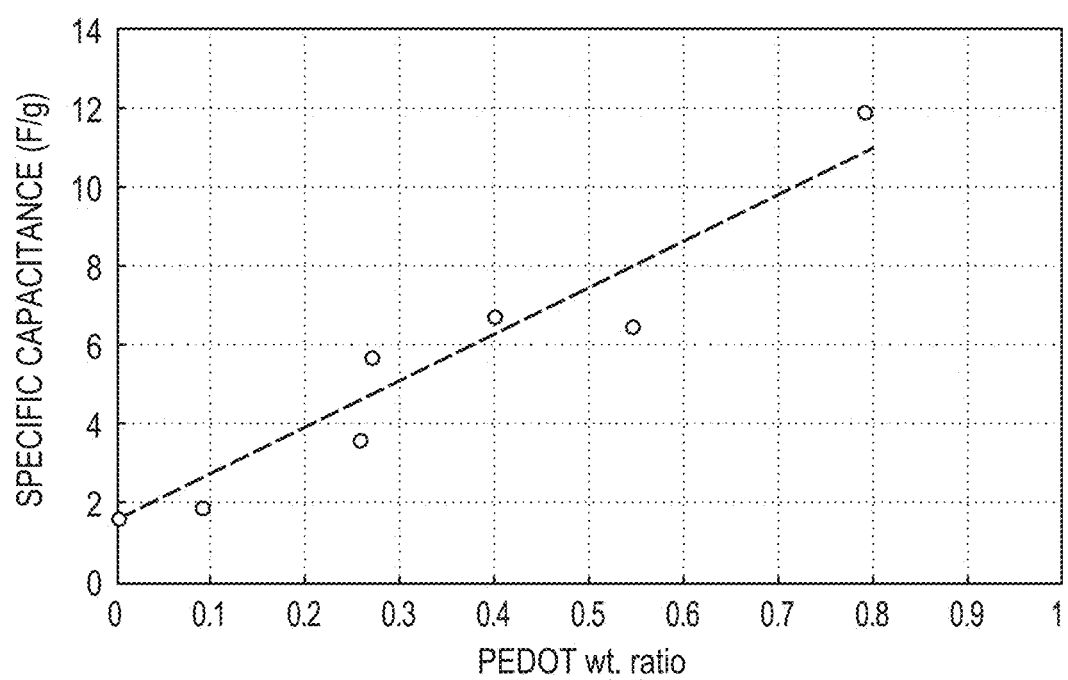
FIG. 5 shows a relationship between gravimetric capacitance and mass of an Nb NW yarn, according to one embodiment.

Gravimetric capacitance increased generally linearly with PEDOT mass fraction and directly correlated to the deposition time. In particular, with reference to FIG. 5 PEDOT was coated on yarns and mass fraction was measured. As FIG. 5 illustrates, the gravimetric capacitance increases almost linearly with the mass fraction. This can be explained by the following mathematical relationship between the PEDOT mass fraction ($\gamma$) and the specific capacitance.

$$SC = (SC_{PEDOT} - SC_{Nb}) \times \gamma + SC_{Nb}$$

Figure 6:
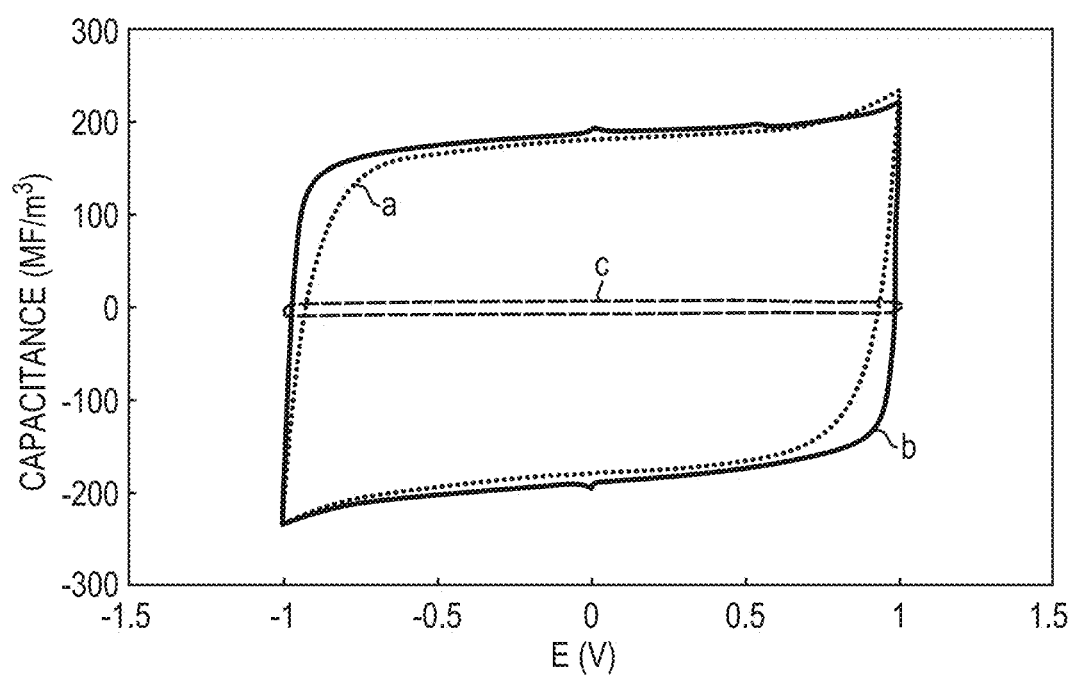
FIG. 6 shows CV curves illustrating the effect of gold wrapping on an Nb NW yarn, according to one embodiment.
Figure 7A:
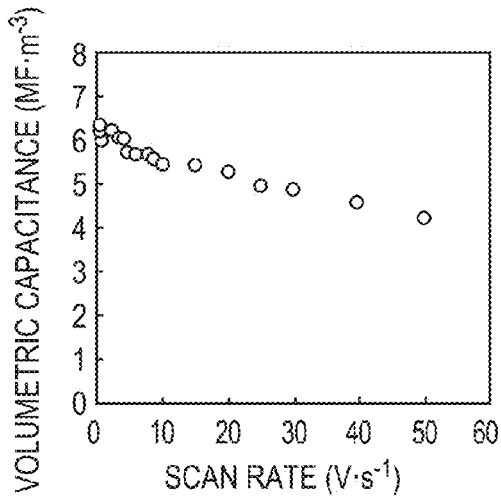
FIG. 7A shows the volumetric capacitance as a function of scan rate of an Nb NW yarn-based supercapacitor, according to one embodiment.
Figure 7B:
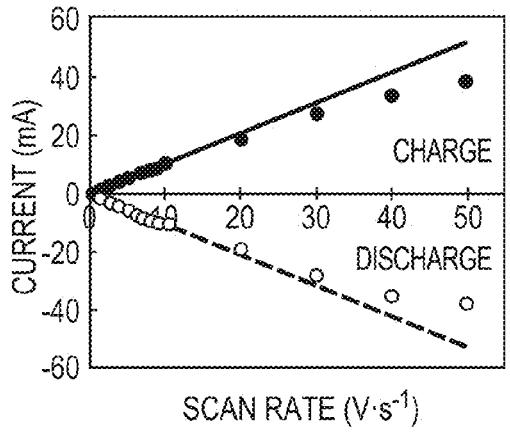
FIGS. 7B-7E show charging and discharging characteristics of a bare Nb NW yarn-based supercapacitor and a PEDOT coated Nb NW yarn-based supercapacitor, according to different embodiments.
Figure 7C:
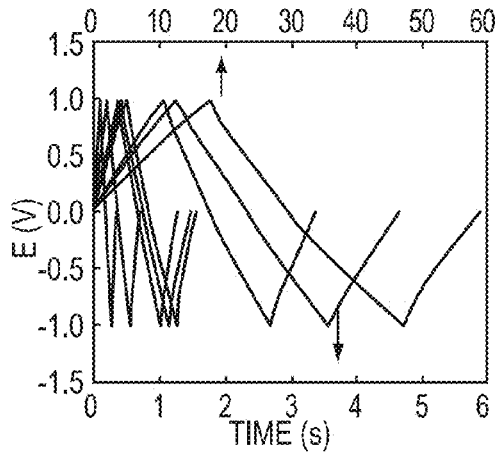
Figure 7D:
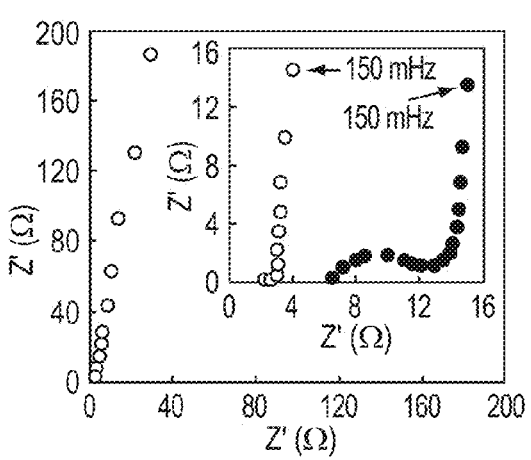
Figure 7E:
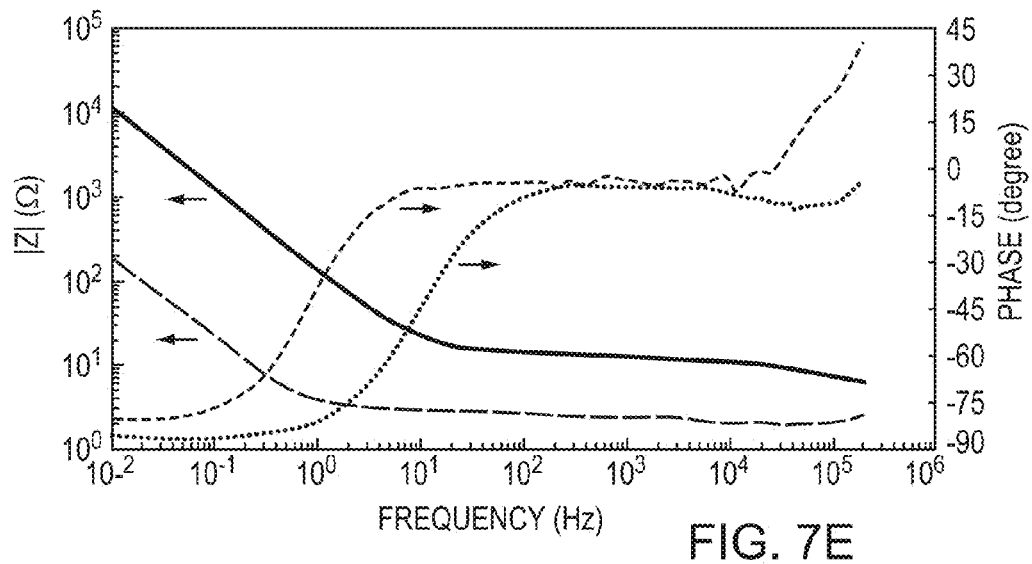

An advantage of metal nanowire capacitors is that they are much less reliant on having a separate metal backing. Niobium is more conductive than carbon nanotubes but less conductive than gold, so the addition of gold as a backing was used to test if a rate of response could be increased by reducing electrode resistance or possibly PEDOT:Nb contact resistance. Two pieces of 25 µm gold wire were wound around two PEDOT coated niobium electrodes (65 mm active length and 100 µm diameter with a 9 µm thick separator in between) to act as charge collectors. With reference to FIG. 6, a comparison of cyclic voltammograms of two electrode capacitors with and without the gold backing indicates that the resistance is lowered by the gold. The curves "a" and "b" are the CV curves obtained before and after wrapping an Nb NW yarn sample with gold wires (at 100 mV/s). CV of the sample before PEDOT deposition are shown by curve "c". This drop in resistance is a result of the lower resistance along the length of the capacitor. Adding the gold can reduce the resistance, as determined by the slopes at the inflection points of the CVs in FIG. 6, from about 7Ω, down to just of 2Ω, which is the separator resistance. The resistance of the niobium is then still limiting for long devices—but a carbon nanotube yarn based device would have to be about 100 times shorter to achieve the same resistance, and 10 times shorter for the same time constant. FIG. 7A shows the volumetric capacitance (with unit of MF·m$^{-3}$ or F·cm$^{-3}$) of bare Nb NW yarn (with individual nanowire average diameter of 140 nm) as a function of scan rate for a capacitor with a diameter of 85 µm per electrode and a separator thickness of 9 µm. FIG. 7B shows scaling of current (at zero potential point) as a function of scan rate. At 20 V·s$^{-1}$ the current no longer increases in direct proportion to scan rate. FIG. 7C shows constant current charging and discharging of the supercapacitor before (at 0.3 A·g$^{-1}$, 1 A·g$^{-1}$, 2 A·g$^{-1}$, and 4 A·g$^{-1}$ from right to left respectively) and after (at 0.9 A·g$^{-1}$, 1.5 A·g$^{-1}$, 3 A·g$^{-1}$, and 3.7 A·g$^{-1}$ from right to left respectively) depositing PEDOT (all per mass of dry electrode). FIG. 7D is a Nyquist plot of the PEDOT coated supercapacitor, and the inset shows the Nyquist plots for bare and PEDOT coated samples. FIG. 7E is a Bode plot of the supercapacitor before (solid line) and after (dashed-line) PEDOT deposition.

Constant current charge/discharge response of a Nb NW yarn before and after coating with PEDOT is shown in FIG. 7C. The charge/discharge time for the PEDOT coated sample increases, but it is nevertheless a capacitive response.

The combination of high conductivity of the metal nanowires and high volumetric capacitance of the filler, i.e., pseudocapacitive material such as PEDOT provides an opportunity to achieve both high energy and high power densities. Various separators (such as glass fibers, perfluorosulfonic acid polymer (such as Nafion™) membrane, and millipore membrane) were tested. Cellulosic-based thin sheets (made of micron sized cellulosic wood pulp fibers) had the highest ionic conductivity (3.4 S·m$^{-1}$ in 1M sulfuric acid) with electrolyte uptake of up to 600%. In particular, different separator sheets were prepared by using cellulosic wood pulp fiber of different sizes. The sizes are selected such that the fibers can be classified as microfibers (MF). The properties of the separators are included in Table 2. The thickness of the separator sheets was measured (e.g., using an L&W Micrometer at 1 μm resolution). The electrolyte uptake of the separator sheets was obtained by measuring the weight of dry sheets and then immersing the sheets in 1M sulfuric acid for 2 hours. Finally, the sheets were removed from electrolyte and wiped with filter paper and the weight of the wet sheets was recorded. The electrolyte uptake was then calculated by $(m_{wet}-m_{dry})/m_{dry}$. The tensile strength of the sheets can be obtained using a tensile tester such as a QC-II tensile tester. To determine the wet strength of the sheet in electrolyte solutions, the sheets were cut into 7 mm stripes and kept in 1M sulfuric acid solution for 2 hours prior to tensile testing.

Figures 8A, 8B, 8C:
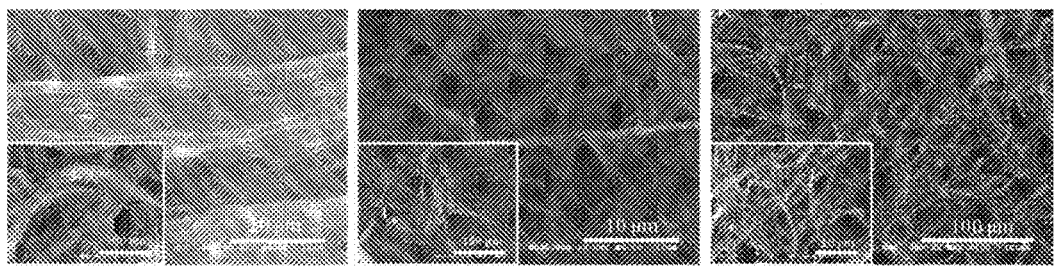
FIGS. 8A-8C are SEM images of three different microfiber (MF) separators, according to three embodiments.

The surface morphologies of three different MF separators made with cellulosic wood fibers of 977 μm, 399 μm, and 177 μm are shown in FIGS. 8A-8C. To clearly see the structure of microfibers, the samples were freeze dried for SEM imaging to prevent collapse or shrinkage of cellulosic fiber. The 9 μm thick separator made from 177 μm fibers showed the best performance for aqueous electrolytes.

TABLE 2

Mechanical properties of some of the separators used in the design of the supercapacitor.

| Fiber Size in Pulp Suspension (μm) | Thickness of Sheet (μm) | Areal Density (g/m$^2$) | Electrolyte uptake (%) | Tensile Strength (Nm/g) | Wet Tensile strength (Nm/g) |
|---|---|---|---|---|---|
| 977 | 179 | 60 | 209 | 53.5 | 0.9 |
| 561 | 60 | 58 | 151 | 104.7 | 1.1 |
| 339 | 11 | 12 | 264 | 36.6 | 2.7 |
| 177 | 9 | 10 | 602 | 70.9 | 6.37 |
| Kim wipes | 104 | 20 | 200 | 4.9 | 0.71 |

Ionic conductivity of the separator plays an important role in the ESR. To measure the ionic conductivity of the separator, two flat sheets of niobium foil (e.g., Alpha Aesar) were used with a cellulosic-based thin sheet separator in-between. The sheet was soaked in 1M sulfuric acid for 30 min before performing the test. A few drops of 1M sulfuric acid were added to the separator after assembling the device. Ionic conductivity of 3.4 S m$^{-1}$ was measured for the 9 μm thick sample which corresponds to lower resistance (~0.5Ω), than the total ESR of the supercapacitor (2Ω). The ionic resistance of the separator was also measured with a four point ionic conductance apparatus. The results showed the same ionic conductivity value for the separator within experimental uncertainty. Ionic conductivity of separators made with perfluorosulfonic acid polymer such as Nafion™, glass fibers, and millipore membranes were 0.06 S m$^{-1}$, 0.58 S m$^{-1}$, and 0.08 S m$^{-1}$ respectively.

Having a highly ionically conductive separator can reduce the equivalent series resistance, which can increase the power density. Due to the hydrophilicity and high tensile strength of microfiber cellulose film-based materials, they were used in various high power storage devices described herein.

Wrapping gold or platinum micro wires around the infiltrated yarn as charge collectors can improve the power density of supercapacitors made with CNT yarns coated with conducting polymers. One may avoid using external charge collector wires in the niobium device-performance evaluations since the Nb nanowire yarns already have a high conductivity. Due to the high conductivity of the electrolyte, the separator, and the electrode itself, Nb NWs supercapacitors may provide high performance at fast charging rates with relatively little loss of capacitance as scan rate is increased to 50 V·s$^{-1}$, as shown in FIGS. 7A and 7B.

Figure 9:
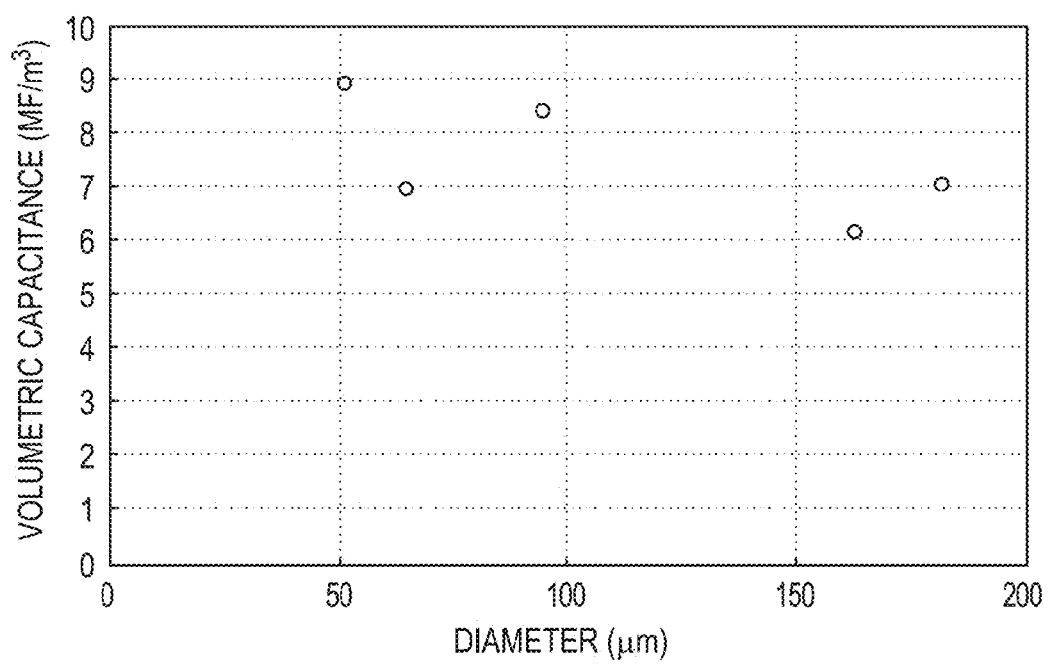
FIG. 9 shows the volumetric capacitance of an exemplary Nb NW based yarn as a function of the diameter thereof.

To evaluate the scalability of a device, volumetric capacitance as a function of diameter and inserted twist was measured. In particular, capacitance of bare niobium nanowire yarns was measured by dipping yarns of same length and twist, but different diameters, in 1M sulfuric acid and performing cyclic voltammetry at scan rate of 50 mV/s. For the counter electrode, one very large diameter Nb NW yarn was placed at about 20 mm away from the working electrode. As FIG. 9 shows, volumetric capacitance of the yarn appears to decrease somewhat as the diameter increases. The yarn included a twist of 800 turns/m, and the volumetric capacitance was measured at different diameters at a scan rate of 50 mV/s. Since the scan rates are slow comparted to the charging time, this apparent decrease may be due to the fact that as the diameter increases for the same twist, the density of the yarn increases, possibly reducing ion accessible surface.

Figure 10:
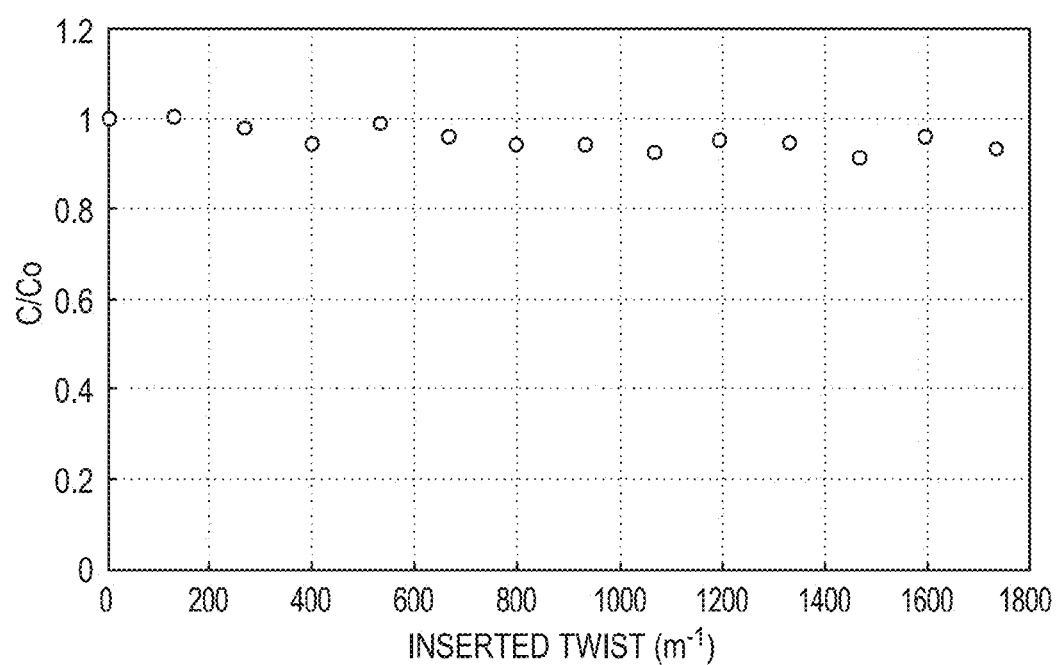
FIG. 10 shows a relationship between capacitance and inserted twist of an exemplary Nb NW yarn.

The capacitance of a 50 μm diameter Nb NW yarn, measured at 50 mV/s, decreased by almost 10% when a twist at 1700 turns/m was inserted, as shown in FIG. 10. Once again, this may be explained by the fact that as the twist increases the porosity decreases; therefore, less ion-accessible area may be available, likely leading to a decrease in capacitance. As the diameter increases by about 3.5 fold, the volumetric capacitance only decreases by a factor of about 1.5, which is much less than the value reported for PEDOT coated CNT yarns, where the volumetric capacitance can decrease by a factor of 2 corresponding to an increase in diameter by a factor of 1.4). Capacitance as a function of twist shows a less than 10% decrease in capacitance when the twist is increased from zero twist to close to the breaking point, where the twisted yarn may break.

Figures 11A, 11B:
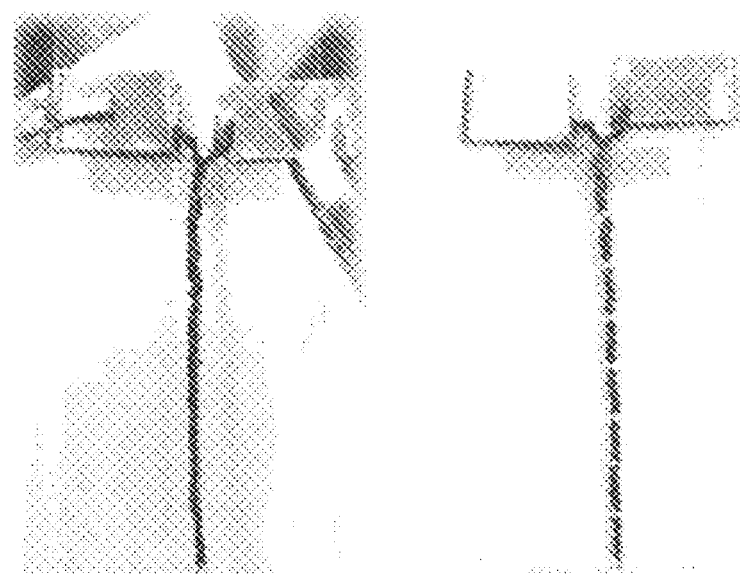
FIGS. 11A and 11B show twisted Nb NW based supercapacitors according to various embodiments.
Figure 12A:
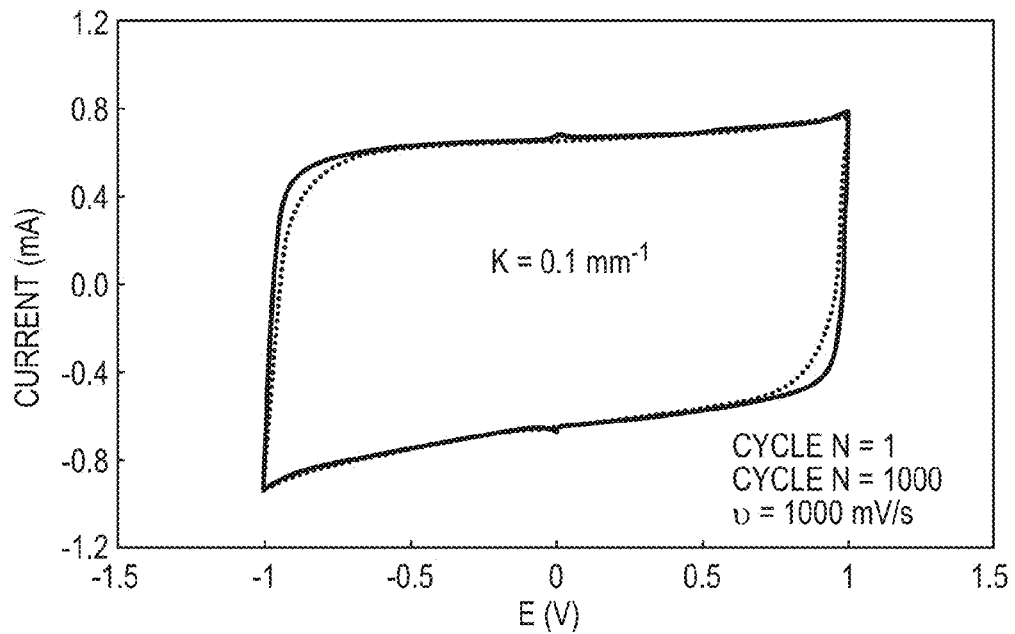
FIGS. 12A-12C show CV curves for Nb NW-based supercapacitors, according to various embodiments.
Figure 12B:
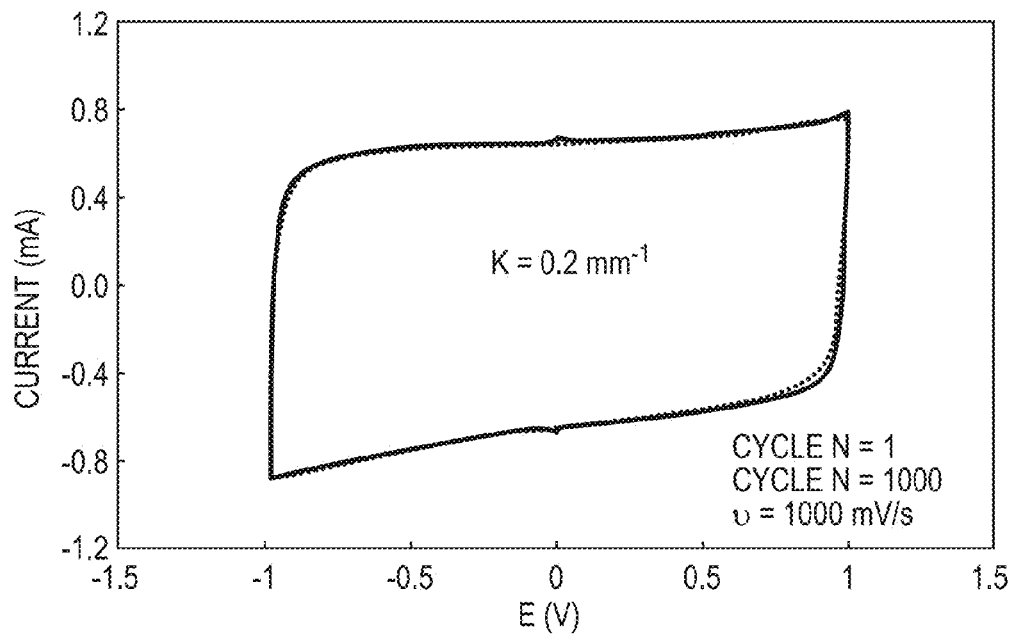
Figure 12C:
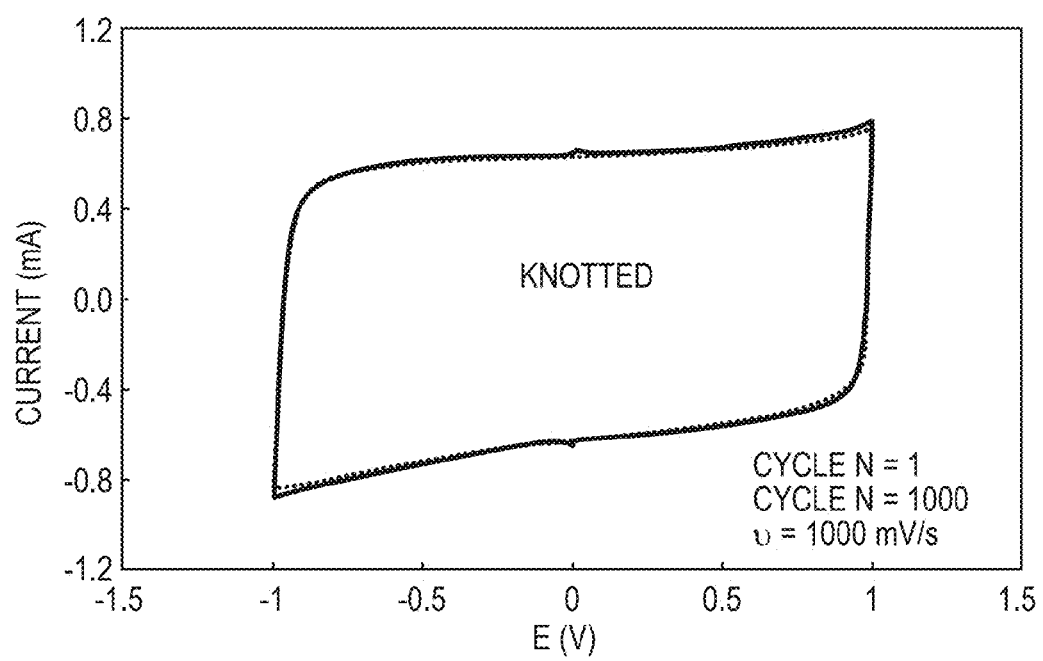

The thread-like form of the capacitors suggests that they can be employed in wound, knitted, braided, woven or knotted configurations. FIGS. 11A and 11B show flexible supercapacitor cells made with Nb NWs and PVA:H$_2$SO$_4$. FIG. 11A shows a 40 mm long twisted Nb NWs supercapacitor infiltrated with solid electrolyte mounted on a glass slide. FIG. 11B shows that the supercapacitor shown in FIG. 11A was cut from the tip into several smaller cells to measure the relationship between length and capacitance of the cell. FIGS. 12A and B show CV curves of a supercapacitor (made from bare Nb NWs) before and after the performance of 1000 bending tests, while FIG. 12C shows a CV curve for a device that is knotted, as shown in FIG.

13A. In all cases the change in capacitance was negligible. The knotted case shows that even when knotted there is no significant change in capacitance, after performing 1000 cycles of each deformation test. In the process of knotting a tight knot was formed, with the radius of curvature approximately equal to twice the radius of the device ($\kappa$=0.4 mm$^{-1}$).

Figure 13A:
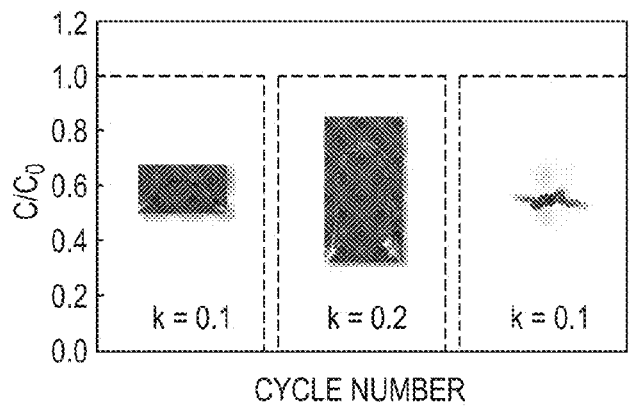
FIGS. 13A-13D show life cycle tests of Nb NW yarn-based supercapacitors according to different embodiments.
Figure 13B:
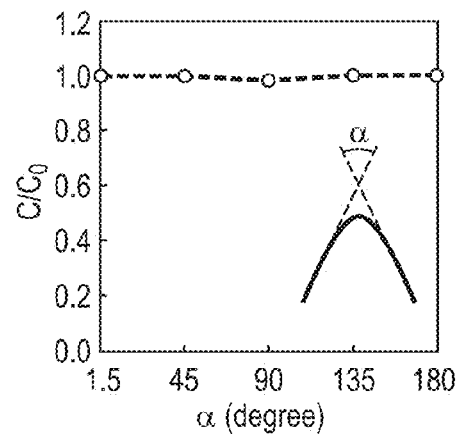
Figure 13C:
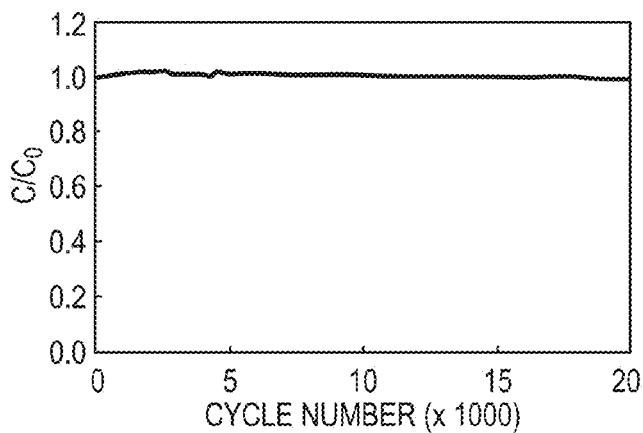
Figure 13D:
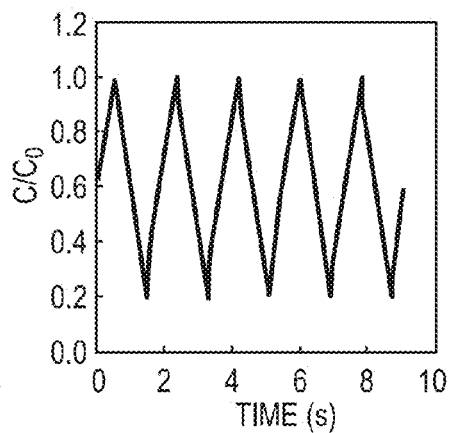
Figure 13E:
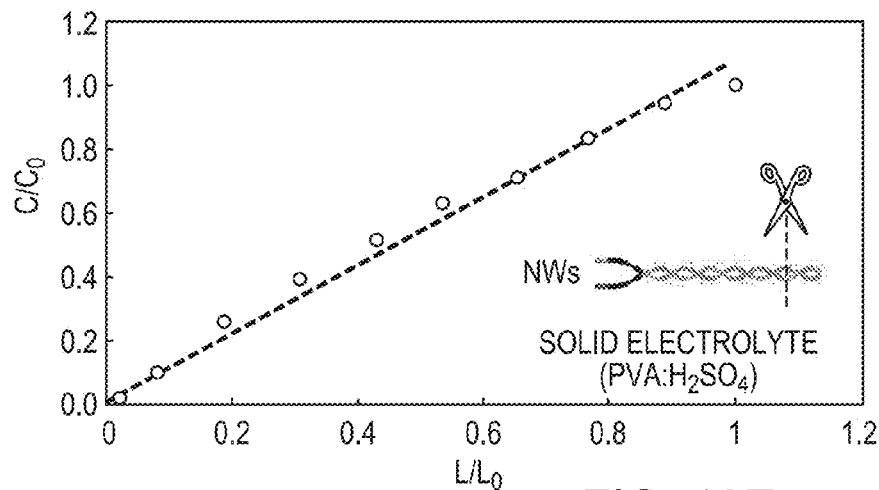
FIG. 13E shows a relationship between capacitance and length of an Nb NW yarn-based supercapacitor having a solid electrolyte, according to one embodiment.

FIG. 13A shows the performance of a solid-electrolyte-based supercapacitor of length 50 mm and diameter 140 μm measured under different deformation states for 1000 cycles. The unit for curvature is (mm)$^{-1}$. As shown in FIG. 13B, the sample was then bent at increasing angles and the performance was measured again. FIG. 13C shows the result of a life cycle test of a sample in 2M sulfuric acid performed using 10 mA for 20,000 cycles. FIG. 13D shows the first and last 5 cycles of constant current charge/discharge test for the 20 k life cycle test. In these experiments one cycle is considered to be one full charge/discharge from 0V to 1V to 0V. FIG. 13E shows the capacitance vs length relationship. One 40 mm long supercapacitor made with solid electrolyte was shortened in 4 to 5 mm increments, and its capacitance was measured at each step, to obtain the capacitance-length relationship. These life cycle tests show that these devices can withstand bending and knotting and, therefore, can be used in fabrics.

Electrochemical impedance spectroscopy was performed to measure the ESR and the frequency response of supercapacitors, as shown in FIGS. 7D and 7E. An ESR of 2Ω was achieved in aqueous electrolyte (1M sulfuric acid). The electronic resistance of the 60 mm long metal nanowires is of a similar magnitude suggesting that this, perhaps combined with the separator resistance, is determining the ESR. A carbon multi-walled nanotube yarn of the same dimensions without a collector would likely have a resistance about 100 times larger, a similar capacitance, and thus about 100 times slower charging speed. The absence of an additional charge collection layer is an important advantage of using a nanostructured metal electrode, rather than relatively poorly conductive carbon, and reduces the contact resistance. For the embodiments having a solid electrolyte, the ESR is twice the liquid based supercapacitor. The dominant time constants are 30 ms for the metal nanowire and 200 ms when it is PEDOT infiltrated. An impedance model for the supercapacitor was determined as follows.

Figure 14:
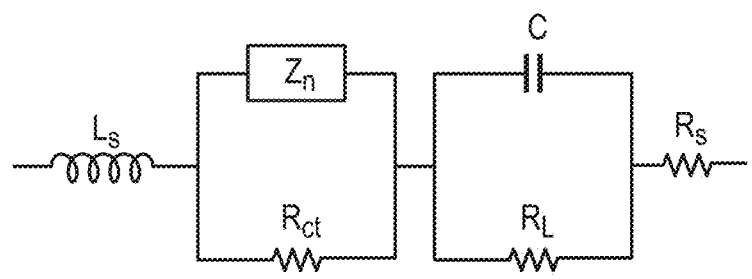
FIG. 14 depicts a circuit model of an Nb NW yarn based supercapacitor, according to one embodiment.

Initial parameters for the electrochemical impedance modeling were obtained from the Nyquist and Bode plots of the frequency response of an embodiment of a supercapacitor. A circuit model of the porous electrode in electrolytic media is shown in FIG. 14. $R_s$ is solution resistance, C is the capacitance, $R_{ct}$ is the charge transfer resistance, and $Z_D$ is the diffusion impedance that can modelled with a Warburg element or a transmission line. Warburg element with P=0.5 is used for this modelling.

Figure 15A:
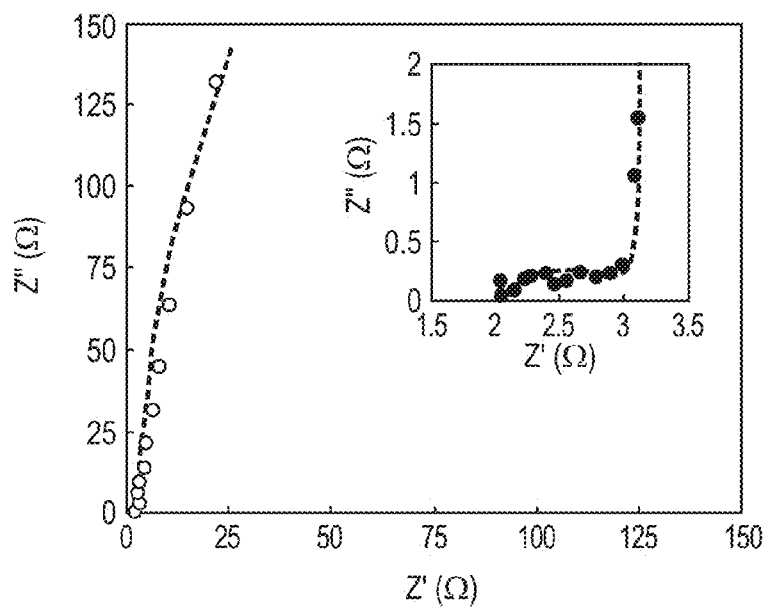
FIGS. 15A-15B show impedance of an exemplary Nb NW yarn-based supercapacitor and a corresponding circuit model.
Figure 15B:
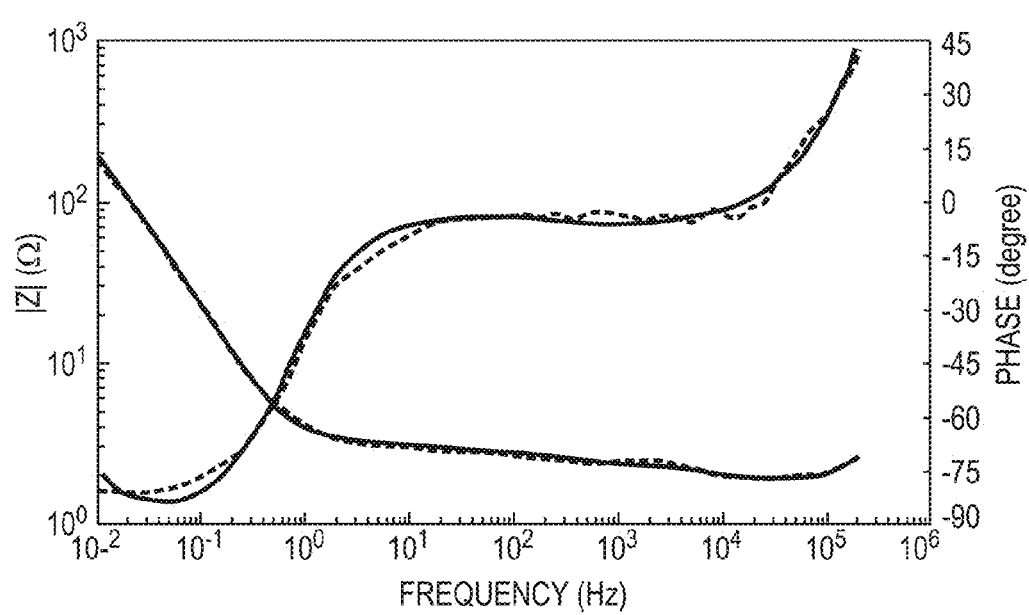

The model impedance was matched with the measured frequency response shown in FIGS. 15A and 15B. FIG. 15A shows a Nyquist plot of a Nb/PEDOT supercapacitor. The data points indicated by dots represent experimental values and the curve line represents the simulation results from the model. The subplot highlights the high frequency part of the Nyquist plot. FIG. 15B shows a Bode plot of the frequency response. The dashed lines represent the simulation results. Table 3 shows the time constants and other parameters in the modelling.

TABLE 3

| Circuit model parameters | | |
|---|---|---|
| Parameters | Symbol | Value |
| ESR | $R_S$ | 1.86 Ω |
| Leakage resistance | $R_L$ | 931 Ω |
| Charge transfer resistance | $R_{ct}$ | 1.29 Ω |
| Equivalent series inductance | $L_s$ | 1.42 μH |
| Double layer capacitance | $C_{dl}$ | 181 μF |
| Capacitance | C | 74 mF |

Figure 16:
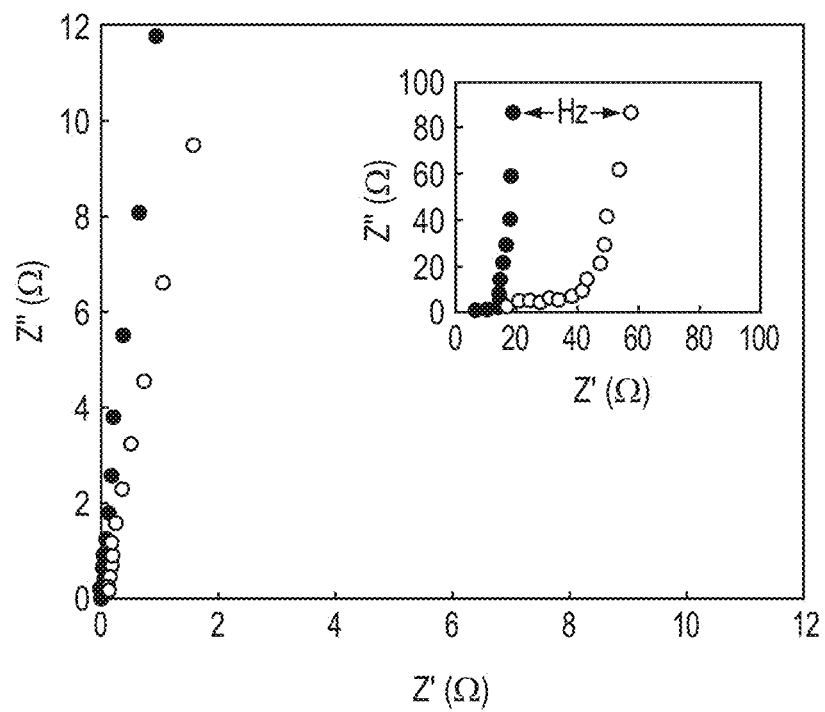
FIG. 16 shows a comparison of Equivalent Series Resistance (ESR) for bare and PVA coated Nb NW based supercapacitors, according to two embodiments.

Along with the devices containing liquid electrolytes, solid electrolyte supercapacitors were made for flexible applications using Polyvinyl Alcohol: sulfuric acid solid electrolyte. For devices of length 50 mm and diameter 140 μm, FIG. 16 shows Nyquist plots for niobium NW supercapacitor before and after infiltrating with PVA as a solid electrolyte. The subplot shows Nyquist plots in the higher frequency region. Electrochemical impedance spectroscopy (EIS) was performed from 200 kHz to 22 mHz (for PVA: $H_2SO_4$) and from 200 kHz to 10 mHz (for bare Nb NW yarns), at 6 points per decade. These results show that the ESR was higher for PVA coated samples.

Ultimate tensile strength of niobium nanowire yarns, when twisted, can be as high as 1.1 GPa which is higher than that of twisted carbon nanotube yarns and graphene yarns. This property combined with its flexibility, which can be described in number of bends, knots, and/or twists per unit length of the yarn, facilitates integration of Nb NW yarns into fabrics. To test the ability of the devices to bend, twist and knot, a solid electrolyte based supercapacitor was made. The performance was measured at different deformation states and the results shown in FIG. 13A indicate almost no change in the performance with bending and knotting. Bending tests were also performed to evaluate flexibility of the device and these tests show almost no changes in capacitance when bending from 0 to 180 degrees, as depicted in FIG. 13B.

Life cycle was measured by using a constant current charge/discharge technique. The capacitance was almost fully retained over 20,000 cycles, with the capacitance as a function of cycle number shown in FIG. 13C. Coulombic (or equivalently Faradaic) efficiency is close to unity through the 20,000 cycles performed. In particular, to determine the evolution of parasitic reactions over time, Faradaic (also known as Coulombic) efficiency of the supercapacitor was calculated from the data for constant current charge/discharge at 10 mA (1 A/g) in 2M acid sulfuric for 20,000 cycles using the following equation:

$$\eta_c = \frac{Q_{out}}{Q_{in}} = \frac{t_{discharge}}{t_{charge}}.$$

Figure 17:
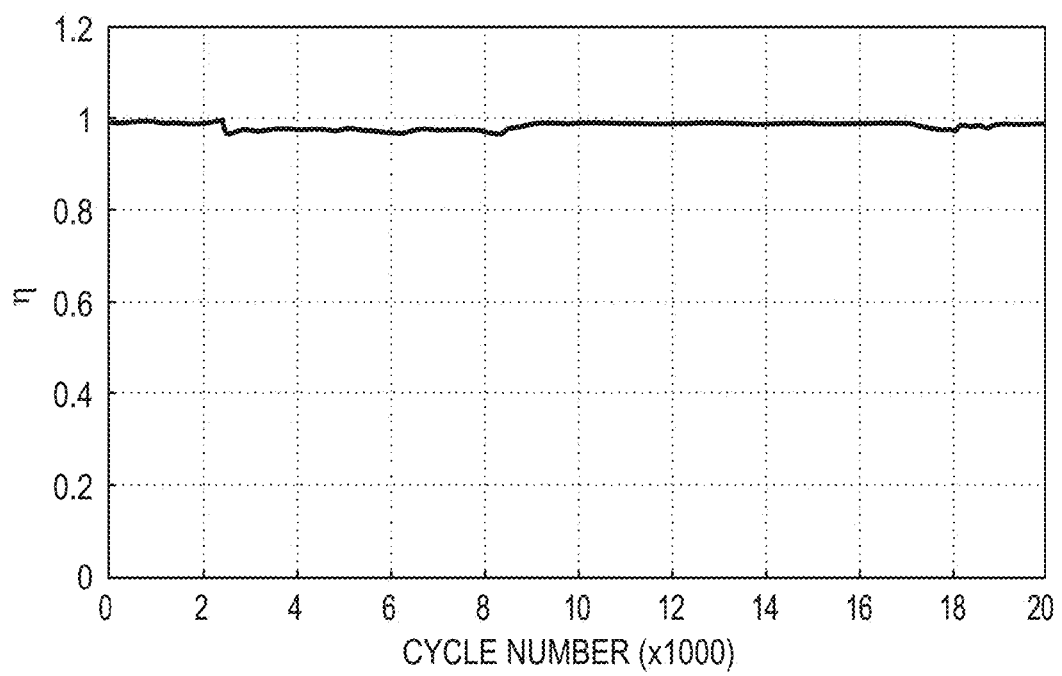
FIG. 17 shows Coulombic efficiency of a supercapacitor, according to one embodiment.

As FIG. 17 shows, this efficiency was steady around unity, which indicates the electrochemical stability of the yarns and the separator in acidic environment. FIG. 13D shows the first and last ten cycles of constant current charge/discharge almost completely match, thereby indicating no loss of performance at the end of the life cycle test.

One solid electrolyte-based supercapacitor was cut from the end and the capacitance was measured, showing a linear relationship between length and capacitance, as shown in FIG. 13E. Accordingly, this indicates that the supercapacitor structure may contribute to the capacitance uniformly along the length.

Figure 18:
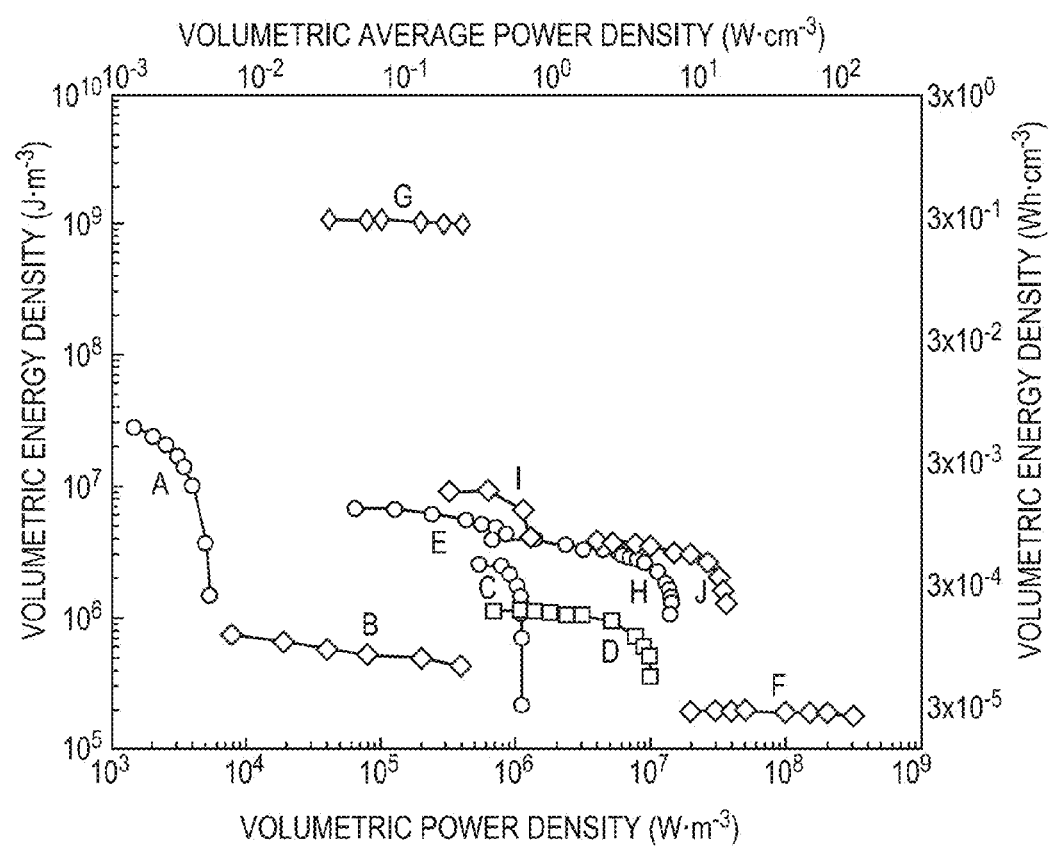
FIG. 18 shows a comparison of Ragone plots for a lithium-based battery, a carbon fiber supercapacitor, a Maxwell supercapacitor, and Nb NW yarn based supercapacitors, according to various embodiments.

FIG. 18 shows a comparison of Ragone plots, describing volumetric energy and power densities of various devices. Specifically, Curve A is a Ragone plot for a 4V/500 µAh Li thin-film battery, Curve B is a plot for a MnO$_2$ carbon fiber supercapacitor, Curve C is a plot for a 2.75 V/44 mF activated carbon electrochemical capacitor, Curve D is a plot for a 3.5 V/25 mF supercapacitor, Curve E is a plot for a 2.7 V/1 F Maxwell supercapacitor, Curve F is a plot for a 63V/220 µF electrolytic capacitor, Curve G is a plot for a Panasonic (17 500) Li-ion battery, Curve H is a plot for a bare Nb NW yarn supercapacitor in ionic liquid (tetraethylammonium tetrafluoroborate in propylene carbonate (1M)) operating at 3V, Curve I is a plot for a PEDOT coated Nb NW yarn supercapacitor, and Curve J is a plot for a two-ply CNT/PEDOT electrode supercapacitor.

Figure 19:
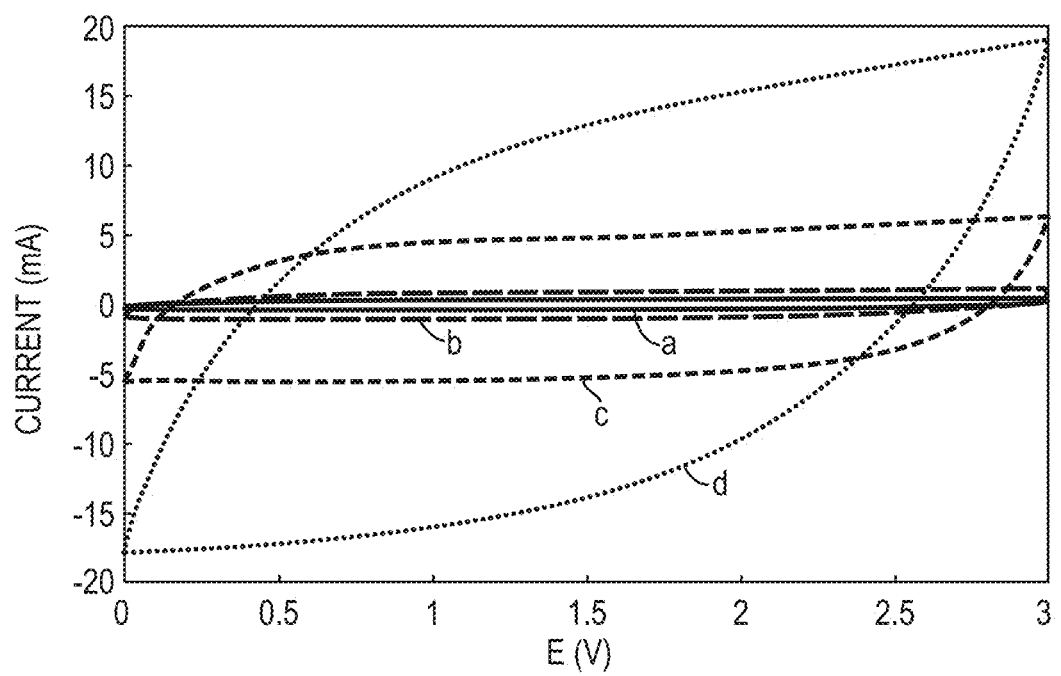
FIG. 19 shows CV curves at different scan rates of a bare Nb NW yarn based supercapacitor cell, according to one embodiment.
Figure 20:
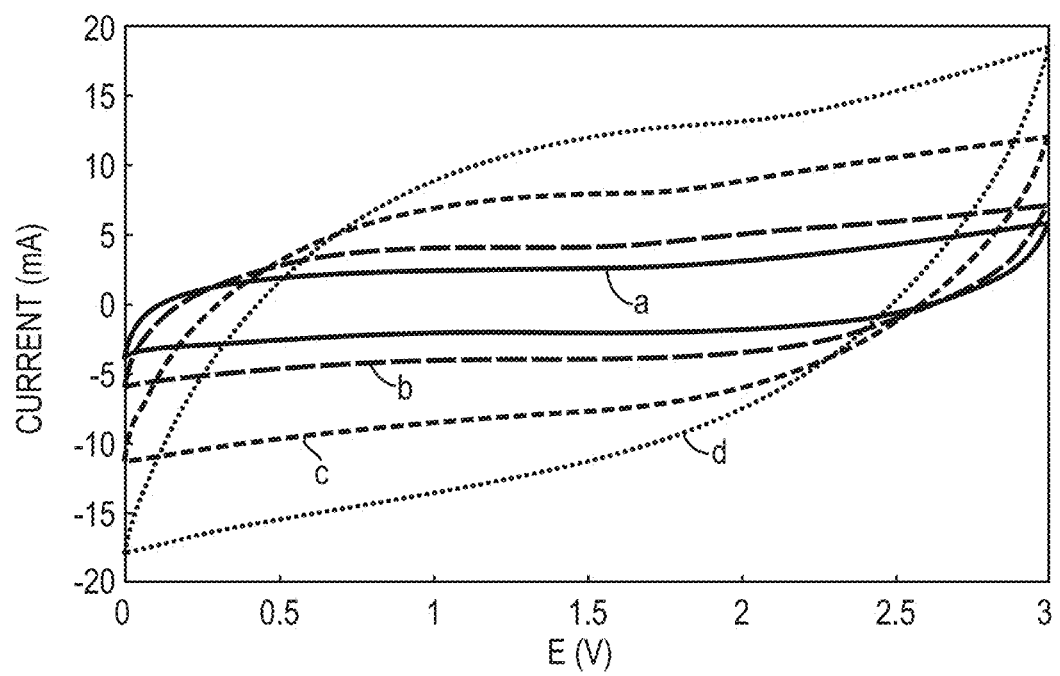
FIG. 20 shows CV curves at different scan rates of a PEDOT coated Nb NW yarn based supercapacitor cell, according to one embodiment.

Peak power density and energy density of 55 MW·m$^{-3}$ (55 W·cm$^{-3}$) and 25 MJ·m$^{-3}$ (7 mWh·cm$^{-3}$) were measured for a supercapacitor made from two bare niobium nanowire electrodes with a separator, which are higher than those measured for ultrafast charging supercapacitors with CNT/PEDOT/Gold, as shown in FIG. 18. However, the average power density, as shown by the curves 'H' ad 'I' in FIG. 18, is lower than the average power density of the CNT/PEDOT/Gold. CV curves scanning from 0V to 3V for the bare niobium yarns and PEDOT coated Nb NW yarns that are depicted in FIGS. 19 and 20, respectively were used to calculate the various data points used in the Ragone plots shown in FIG. 18. FIG. 19 shows CV curves for a cell with ionic liquid for scan rates. Curves "a,", "b," "c," and "d" correspond to scan rates of 100 mV·s$^{-1}$, 1,000 mV·s$^{-1}$, 10,000 mV·s$^{-1}$, and 40,000 mV·s$^{-1}$, respectively. The electrodes were each 60 mm long with diameter of 75 µm. FIG. 20 shows CV curves for a PEDOT coated cell with ionic liquid for various scan rates. Curves "a," "b," "c," and "d" correspond to scan rates 100 mV·s$^{-1}$, 200 mV·s$^{-1}$, 500 mV·s$^{-1}$, and 1,000 mV·s$^{-1}$, respectively. The electrodes were each 97 µm thick, 508 µm wide, and 45 mm long. The high capacitance and energy densities are the result of the high surface capacitance of niobium relative to carbon, and can compensate for the relatively large typical diameter of the niobium nanowire, which is 140 nm, compared to 10 nm of carbon multi-walled nanotubes.

The niobium nanowires may be extracted from copper-niobium composite wires as described in Mirvakili, S. M.; Pazukha, A.; Sikkema, W.; Sinclair, C. W.; Spinks, G. M.; Baughman, R. H.; Madden, J. D. W. "Niobium Nanowire Yarns and their Application as Artificial Muscles," *Adv. Funct. Mater.* 2013, 23, 4311-4316, the entire contents of which are incorporated herein by reference. Nanowires of a transition metal AND OF ALUMINUM? can also be extracted using techniques described in U.S. Pat. No. 5,088,183, to Kanithi, entitled "Process for Producing Fine and Ultrafine Filament Superconductor Wire," the entire contents of which are incorporated herein by reference. Two different techniques may be used to etch the Cu—Nb matrices. Chemical etching is performed by using solution of Nitric acid and de-ionized water. Percentage of the solvent can vary depending on thickness of the raw Cu—Nb matrix. In a second technique, electrochemical reactions may be used to remove the copper. Samples can be immersed in copperic sulfate solution and connected to the positive node of a power supply. A piece of pure copper can be connected to the other polarity and may be immersed in the solution, as well. By applying voltage, copper can be etched away from Cu—Nb sample. Two electrodes may then made from the resulting niobium nanowires by adding small amount of twist to each yarn.

Two 10 mm by 50 mm sheets of niobium thin foil were used with 1M sulfuric acid to measure the capacitance per area of niobium. Electrical conductivity of Nb NW yarns may be measured by using 4-point probe technique as described in Mirvakili, S. M.; Pazukha, A.; Sikkema, W.; Sinclair, C. W.; Spinks, G. M.; Baughman, R. H.; Madden, J. D. W. "Niobium Nanowire Yarns and their Application as Artificial Muscles," *Adv. Funct. Mater.* 2013, 23, 4311-4316.

Volumetric and gravimetric capacitance, power density and energy density of various embodiments of Nb NW-based supercapacitors were calculated as follows. The volumetric and gravimetric capacitance of the bare Nb NW-based supercapacitors were calculated by using $$C_m = \frac{2C_{tot}}{m}, \text{ and } C_V = C_m \times \rho_{Nb},$$

where m is mass of one electrode for the cases of using similar electrodes and $\rho_{Nb}$ is the density of bulk niobium.

The total capacitance was measured using cyclic voltammetry and then using $C_{tot}=I\times v^{-1}$ from the CV curves, where v is the scan rate and I is the value of the current at the symmetry axis, which was at potential of 0 V unless stated otherwise. For PEDOT coated samples the volume of the one electrode was measured and used to find the $C_V$. Many embodiments with PEDOT coated Nb NWs were symmetrical i.e., the two electrodes are similar. For bare Nb NW supercapacitors, in some embodiments, the two electrodes had different masses. As such, the following relation was used to find the capacitance of each electrode:

$$C_1 = C_{tot}(1+\gamma),$$

$$C_2 = \frac{C_{tot}(1+\gamma)}{\gamma},$$

where γ is the mass ratio ($m_1/m_2$).

For life cycle measurements, capacitance was found from the slope for the constant current charge/discharge curves using $$C_{tot} = \frac{I}{dV/dt}.$$

For generating the Ragone plot, volumetric power density ($P_{V(av)}$ (W·m$^{-3}$)) and energy density ($E_V$ (J·m$^{-3}$)) (at device level ($V_{tot}$)) were calculated at each scan rate of v (V·s$^{-1}$) by integrating under the cyclic voltammetry curves (during the discharge cycles—initial potential at $E_i$) as follows:

$$P_{V(av)} = \frac{1}{V_{tot}E_i}\int_{E_i}^{0} IEdE,$$

$$E_V = \frac{1}{V_{tot}v}\int_{E_i}^{0} IEdE.$$

The following equations may be used to calculate the peak volumetric power and energy density.

$$E_V = \frac{C_{tot}E^2}{2V_{tot}},$$

$$P_V = \frac{E^2}{4R_{ESR}V_{tot}}.$$

EIS was performed by sweeping one sinusoidal frequency with amplitude of 20 mV and DC bias of 0.2 V from 200 kHz to 10 mHz. PVA with sulfuric acid was used for the solid electrolyte based supercapacitors. Sulfuric acid, deionized water, and PVA were mixed with mass ration of 1:10:1 and stirred aggressively for 1 hour at 90° C.

The transition-metal-based yarns such as Nb NW yarns generally show higher capacitance and energy per volume, are stronger, and are 100 times more conductive than similarly spun carbon multi-walled nanotube (MWNT) and graphene yarns. The long niobium nanowires, formed by repeated extrusion/drawing can achieve device volumetric peak power and energy densities of 55 MW·m$^{-3}$ (55 W·cm$^{-3}$) and 25 MJ·m$^{-3}$ (7 mWh·cm$^{-3}$), 2 and 5 times higher than for state-of-the-art CNT yarns, respectively. The capacitance per volume of Nb nanowire yarn is lower than the 158 MF·m$^{-3}$ (158 F·cm$^{-3}$) reported for carbon-based materials such as reduced graphene oxide (RGO)/CNT wet-spun yarns, but the peak power and energy densities are 200 and 2 times higher. Achieving high power in long yarns is made possible by the high conductivity of the metal, while high energy density is possible at least in part due to the high internal surface area. In some embodiments, no additional metal backing is needed, unlike for CNT yarns and supercapacitors in general, saving substantial space. By infiltrating the yarn with pseudo-capacitive materials such as PEDOT the energy density can be further increased to 10 MJ·m$^{-3}$ (2.8 mWh·cm$^{-3}$). Niobium nanowire yarns are generally highly flexible and, as such, can be woven into textiles and use in wearable devices.

High performance energy storage devices made as described above from nanowires of transition metals such as niobium are flexible and sewable. The capacitance of these devices can be controlled by selecting the length of the yarn. In general, three mechanism of charge storage can occur: charge storage in the electric double layer at the nanowires/electrolyte interface (i.e., non-Faradaic storage), redox reaction of electrolyte with nanowires (i.e., Faradaic storage), and pseudo-capacitance, by coating the nanowires with other materials of high specific capacitance (i.e., Faradaic storage).

Figure 21:
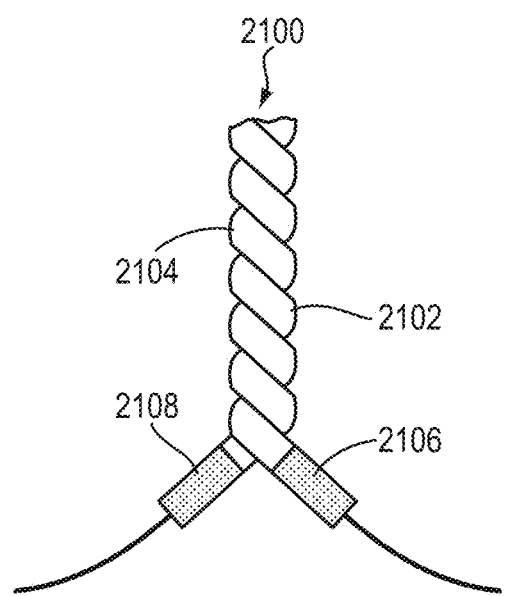
FIG. 21 schematically depicts an Nb NW yarn-based supercapacitor structure, according to one embodiment.

With reference to FIG. 21, an Nb NW based supercapacitor structure 2100 includes a pair of niobium yarns 2102, 2104. Each yarn can be made using a number of niobium nanowires. The diameter of each individual niobium nanowire can be selected from a range 20 nm to 200 nm. The diameter of each yarn 2102, 2104 may be selected from a range of 10 µm up to 1 mm. In some embodiments of the supercapacitor 2100, the diameter of both yarns 2102, 2104 is the same. In other embodiments, however, the diameters of the two yarns can be different. The length of each yarn can be selected from a range of 10 nm up to 10 m. For example, the lengths of the two yarns 2102, 2104 can be 10 nm, 15 nm, 50 nm, 200 nm, 1 µm, 10 µm, 150 µm, 500 µm, 1 mm, 2 mm, 6 mm, 2 cm, 25 cm, 60 cm, 1 m, 2.4 m, 8 m, 10 m, 30 m, 100 m, etc.

Each yarn 2102, 2104 is infiltrated with a flexible, solid electrolyte. One example of a flexible, solid electrolyte is a combination of PVA and sulfuric acid, prepared as described above. A solid electrolyte can also be formed by combining an ionic liquid and fine inert nanoparticles, such as fused silica nanoparticles. In general, a suitable solid electrolyte has ions and ionic conductivity. The yarns 2102, 2104 may be twisted around each other. In some embodiments, a single Nb NW yarn may be looped as shown in FIG. 13E, and the two strings of the loop may be twisted together. The loop may then be cut to separate the two strings into two yarns of the supercapacitor.

Two electrically conductive pads 2106, 2108 may then be attached to the two yarns 2102, 2104, respectively, forming two electrodes, namely, anode and cathode, of the supercapacitor 2100. The pads can be formed using a highly conductive metal such as gold, silver, copper, etc., or the pads can be thin niobium plates. A pad can be a piece of thin foil clamped to the yarn. A pad may also be attached or formed by electrochemical plating. Leads 2110, 2112 may be attached to the two pads 2016, 2108, respectively, for electrically connecting the supercapacitor 2100 with components of a circuitry.

The two yarns 2102, 2104 may be optionally infiltrated with pseudocapacitive materials such as conductive polymers, $MnO_2$, $RuO_2$, etc., so as to increase the volumetric capacitance of the supercapacitor 2100. Alternatively, or in addition, the yarns 2102, 2104 may be coated with activated carbon or graphene to increase the surface area for charge collection. Examples of suitable conductive polymers include poly(3,4-ethylenedioxythiophene) (PEDOT), poly pyrrole, and poly aniline. The conductive polymer can be electrodeposited on each yarns 2102, 2104. In one embodiment, the volumetric capacitance of a supercapacitor having yarns infiltrated with PEDOT was about 50 F/cm$^3$, which is an approximately 70 times improvement over the volumetric capacitance of a supercapacitor made with bare Nb NW yarns.

In some embodiments, a long pair (e.g., 10 cm, 25 cm, 1.5 m, 3 m, etc., and, in general, up to 100 m long pair) of two yarns that are twisted together may be cut into two or more pieces. Using the generally linear relationship between the capacitance of the pair and the length thereof, as illustrated above with reference to FIG. 13E, the lengths of one or more cut portions can be selected according to a specified capacitance. A pair of electrode pads may then be attached to each cut pair of yarns to form two or more supercapacitors, one or more of which have a respective specified capacitance. The capacitance of a supercapacitor can thus be tuned by cutting a twisted pair yarn according to a length thereof as determined by the desired capacitance.

Figure 22:
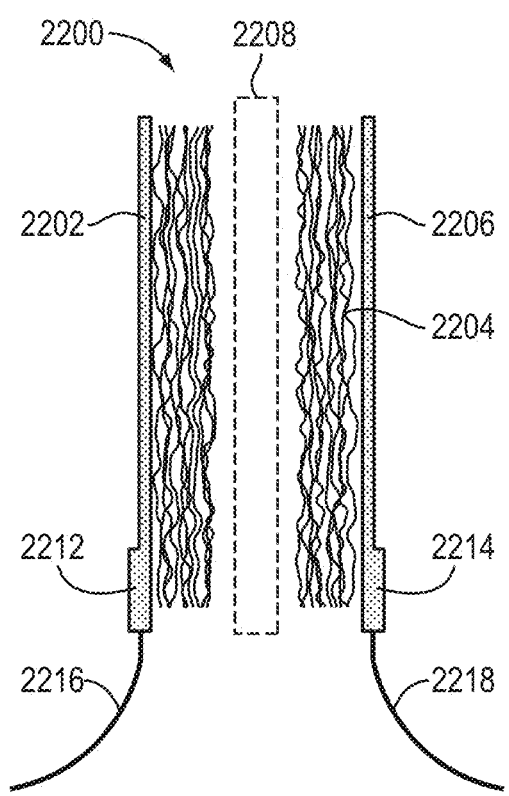
FIG. 22 schematically depicts an Nb NW yarn-based supercapacitor structure with a liquid electrolyte, according to one embodiment.

With reference to FIG. 22, each of the two Nb NW yarns 2202, 2204 is encased within niobium foils 2203, 2205. The yarns and the foils are placed within an enclosure 2206 forming a supercapacitor 2200. The individual niobium nanowires of a particular yarn may be twisted together, or may be disposed together as shown. The diameters of the two yarns can be the same or they can be different. In general, the diameter of each yarn 2202, 2204 can be selected from a range 10 µm to 1 mm. The length of each yarn can be selected from a range 1 µm to 100 m. Nanowires having a diameter in the range 20 nm to 200 nm can be selected to form the yarns 2202, 2204.

The enclosure 2206 can be metallic or non-metallic such as plastic, ceramic, etc. The enclosure may include a separator 2208 that is disposed between the two yarns 2202, 2204. In addition, the enclosure may be filled with a liquid electrolyte 2210. The separator 2208 preferably includes an ionically conductive material. In various embodiments, the separator 2208 may include one or more of: glass fibers, perfluorosulfonic acid polymer such as Nafion™, one or more millipore membranes, and one or more cellulosic-based sheets. The cellulosic-based sheet(s), constructed as described above, may include micron-sized cellulosic wood pulp fibers. The thickness of the separator 2208 may can be selected from a range 1 µm to 100 µm, e.g., about 9 µm. The liquid electrolyte 2210 can be an aqueous electrolyte (e.g., sulfuric acid), an organic electrolyte (e.g., tetrabutylammonium hexafluorophosphate (TBAPF6) in acetonitrile), or an ionic electrolyte (e.g., tetraethylammonium tetrafluoroborate in propylene carbonate). A molten salt can be used as a liquid electrolyte, e.g., when the supercapacitor is to be operated at high temperatures, e.g., up to about 1200° C.

Two electrically conductive pads 2212, 2214 may be attached to the two foils 2203, 2205, forming an anode and a cathode, respectively, of the supercapacitor 2200. Alternatively, the conductive pads may be attached to each yarn 2202, 2204. The pads can be formed using a highly conductive metal such as gold, silver, copper, etc., or the pads can be thin niobium plates. Leads 2216, 2218 can be used to electrically connect the supecapacitor 2200 with one or more components of a circuitry.

Figure 23A:
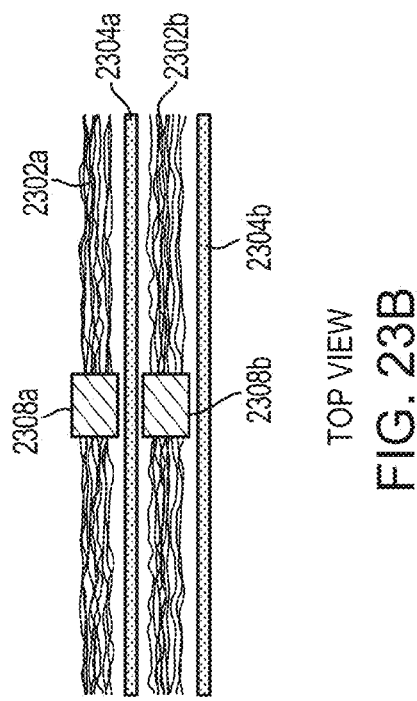
FIG. 23A-23D schematically depict an Nb NW yarn-based supercapacitor having two separators, according to one embodiment.
Figure 23B:
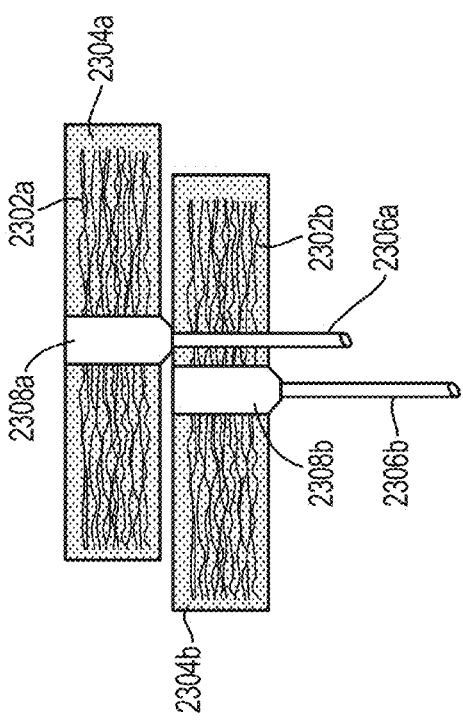
Figure 23C:
Figure 23D:
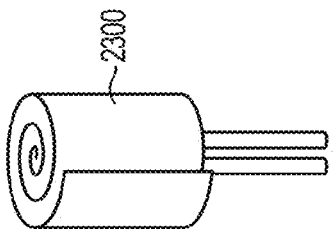

In one embodiment, described with reference to FIGS. 23A and 23B, a pair of yarns 2302a, 2302b of nanowires including aluminum or a transition metal such as niobium, tantalum, vanadium, molybdenum, copper, nickel, iron, platinum, gold, silver, and zinc, and a pair of separators 2304a, 2304b are alternately disposed. The yarns 2302a, 2302b can be optionally infiltrated with a pseudocapacitative material such as a liquid polymer. The separators can be made using one or more of: glass fibers, perfluorosulfonic acid polymer such as Nafion™, one or more millipore membranes, and one or more cellulosic-based sheets. A pair of metallic wires 2306a, 2306b, e.g., wires of gold, silver, platinum, copper, aluminum, or the transition metal used to make the yarn, are clamped around the yarns 2302a, 2302b, respectively. To this end, the ends of the wires 2306a, 2306b may be flatted, e.g., by rolling, to form heads 2308a, 2308b that can be wrapped around the respective yarns 2302a, 2302b. The structure thus formed is then rolled around as depicted in FIGS. 23C and 23D to form a supercapacitor 2300.

Each of the separators 2304a, 2304b can include one or more cellulosic-based thin sheets, which may also function as electrolyte absorbers. To make such separators, micron sized cellulosic wood pulp fibers are obtained by refining softwood pulp. Different fiber sizes may be collected at different refining energies. The average fiber size in a pulp suspension can be measured (e.g. using a Scircco Malvern 2000 Mastersizer). In general, separator sheets can be prepared using pulps having different fiber sizes, e.g., 977, 560, 340, and 177 µm. It should be understood that other sizes, and fewer (e.g., only one fiber size) or more than four fiber sizes can also be used in making the separators. To make the separators 2304a, 2304b sheets with fiber size of about 977 µm, one may use, e.g., a handsheet former. The fiber suspensions with fiber sizes of 560, 340, and 177 µm may be diluted to 0.2 wt % consistency in distilled water followed by stirring at 1000 rpm for 15 min. The suspensions may be poured into petri dishes after 10 min vacuum deaeration and dried at room temperature.

Poly (3,4-ethylenedioxythiophene) (PEDOT) was deposited on the yarns 2302a, 2302b using a galvanostatic deposition technique with current density of 0.8 A·m$^{-2}$ at room temperature. The deposition solution was prepared by making a 0.1M tetrabutylammonium hexafluorophosphate (TBAPF6) solution in 99% propylene carbonate and 1% water later mixed with 0.1M EDOT. In some embodiments, the yarns are not coated with PEDOT but may be coated with a different liquid polymer such as poly pyrrole or poly aniline. In some embodiments, one or both yarns are not coated with any pseudocapacitative material or a liquid polymer.

Figure 24:
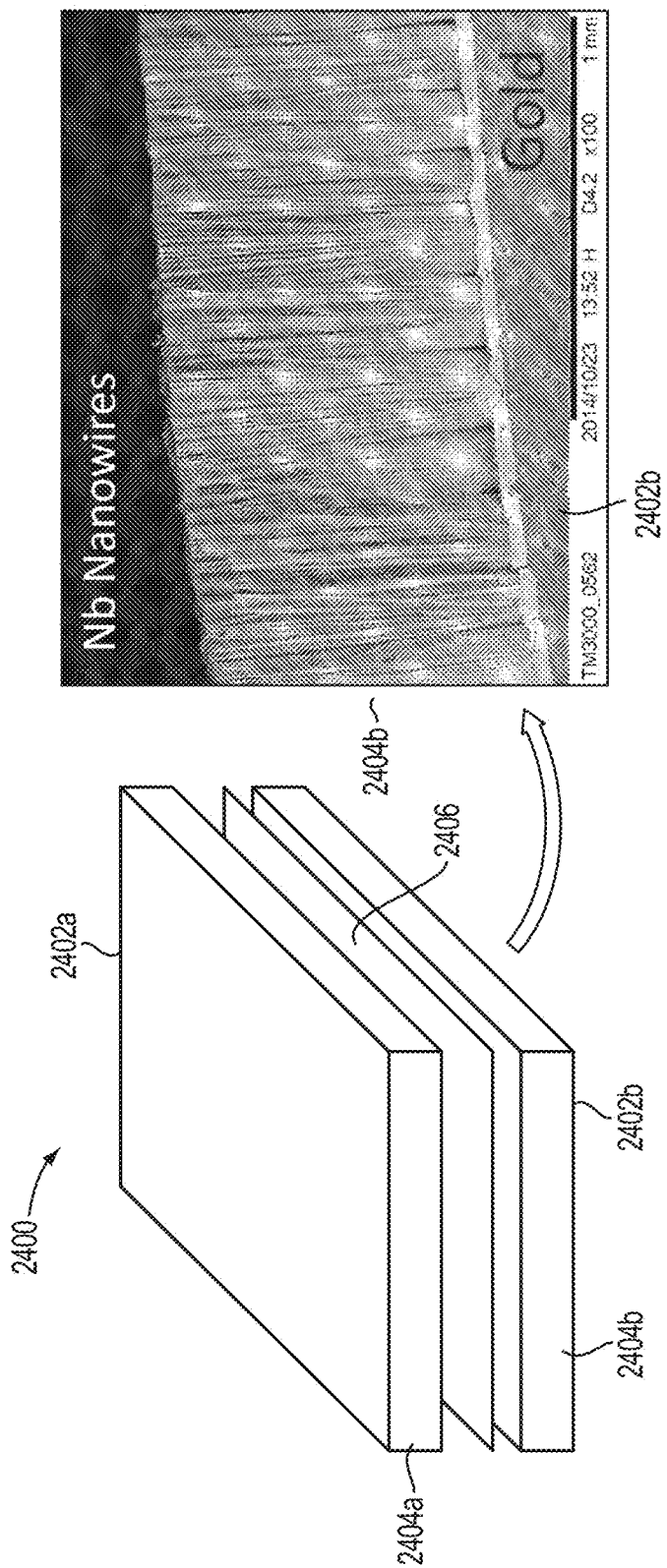
FIG. 24 depicts a niobium nanowire based supercapacitor having metallic electrodes; according to one embodiment.

In another embodiment, with reference to FIG. 24, a supercapacitor 2400 includes a metallic electrode 2402a. The electrode 2402a can be a thin plate or a foil of gold, silver, copper, aluminum, platinum, etc., having a thickness selected from the range 10 µm to 50 µm. The area of the metallic electrode 2402a may be selected from a range 6 mm$^2$ to 600 mm$^2$. Nanowires 2404a including aluminum or a transition metal such as niobium, tantalum, vanadium, molybdenum, copper, nickel, iron, platinum, gold, silver, and zinc may be attached to the metallic electrode 2402a. Preferably, the nanowires 2404a are at an angle in a range from 70° to 110° relative to the surface of the metallic electrode 2402a. The diameter of the nanowires 2404a is selected from a range 20 nm to 200 nm, and the average length of the nanowires 2404a is selected from a range 1 µm to 1000 µm.

The volumetric space of the electrode 2402a can be specified as the product of the area of the electrode 2402a and the average length of the nanowires 2404a. In some embodiments, the nanowires are deposited on the electrode such that only up to about 20% of the volumetric space of the electrode 2402a is consumed by the nanowires 2404a. The available free space can be used to coat the nanowires with other materials, such as liquid polymers. This can increase the capacitance of a supercapacitor formed using the electrode 2402a having the nanowires 2404a attached thereto.

A second electrode 2402b, having nanowires 2404b attached thereto may be similarly formed as the first electrode 2402a. The two electrodes may be disposed such that the free ends of the nanowires 2404a point to the electrode 2402b and the free ends of the nanowires 2404b point to the electrode 2402a, forming a supercapacitor 2400. A separator 2406 is disposed between the two groups of nanowires 2404a, 2404b. The separator 2406 can be made using one or more of: glass fibers, perfluorosulfonic acid polymer such as Nafion™, one or more millipore membranes, and one or more cellulosic-based sheets. The distance between the two electrodes 2402a, 2402b is generally determined by the thickness of a separator disposed there between. Typically, the thickness of the separator can be selected from a range 1 µm to 100 µm.

Optionally, in some embodiments, the structure including the two electrodes 2402a, 2402b, the two groups of nanowires 2404a, 2404b, and the separator 2406 can be disposed within a sealed enclosure filled with an ionically conductive liquid electrolyte, examples of which are provided above. In these embodiments, the metal used to form the electrodes and the electrolyte are selected to be chemically compatible with each other, and/or to have low interfacial polarization.

In one embodiment, the structure that includes the electrode 2402a, having nanowires 2404a attached thereto is fabricated as follows. A Nb—Cu nanocomposite wire is cut using an electro-discharge machine (EDM) into pieces that are 250 µm long. In other embodiments, the length of the pieces can be any number between 1 µm and 1,000 µm, such as 2, 10, 50, 100, 120, 200, 500, 600, or 725 µm. The length of the pieces can be selected according to a desired capacitance. The cut pieces are grouped together into a rectangular shape of size of 3 mm×4 mm. Other sizes (e.g., 1 mm×1 mm, 2 mm diameter, 50 mm$^2$, etc.), and shapes, such as circular, oval, square, etc., are also possible. The grouped pieces may then be polished with sand paper in two steps. The first step involves using a coarse sand paper to remove any residues from the EDM process and the second step involves using a fine sand paper to make the top and bottom surface of the pieces clean and smooth.

Next, the grouped pieces may be rinsed with acetone, ethanol, and deionized (DI) water. After rinsing they are sonicated in a 3:2 ratio solution of (50% nitric Acid and DI water):(DI water) for 1 hour. Thereafter, one side of each grouped piece is coated with hot glue or any dissolvable adhesive to protect that surface from being electroplated. The grouped pieces are then electroplated with gold. To ensure deposition of gold over the niobium nanowires the selected current density is 0.34 mA/m$^2$, and the selected duration of electroplating is 18 hours. After performing the electroplating the grouped nanowire pieces are rinsed with DI water and the masking adhesive is removed. Thereafter, the electroplate nanowires are etched with a 50% nitric acid solution for 48 hours. After etching the matrix in nitric acid solution, gold platted niobium nanowire electrodes are formed.

Figure 25:
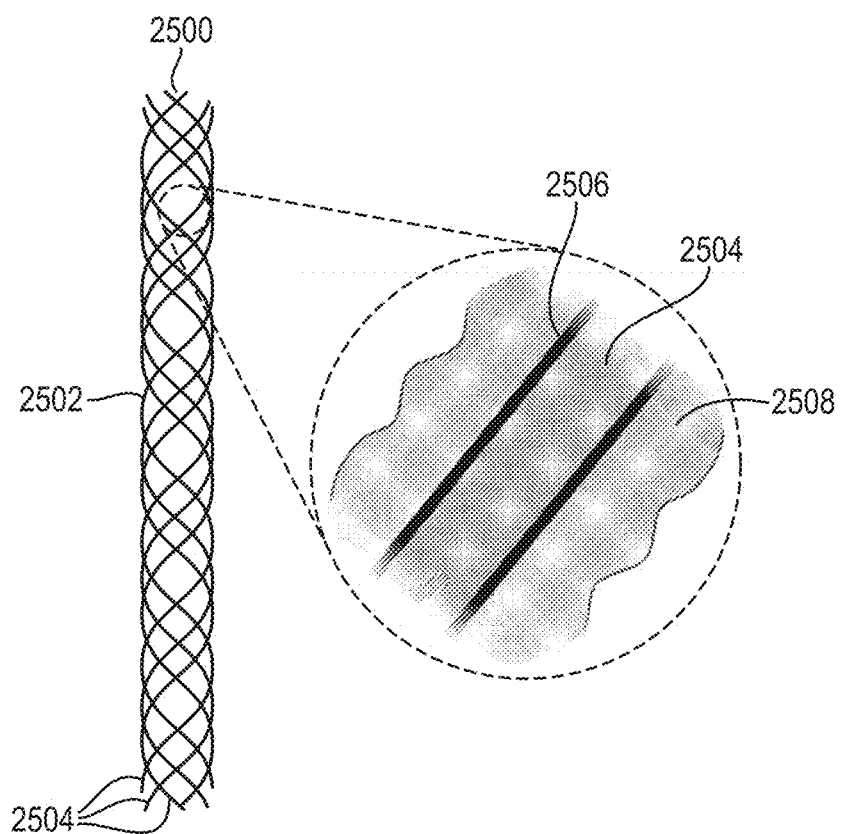
FIG. 25 shows an Nb NW yarn-based supercapacitor having a niobium pentoxide layer, according to one embodiment.

In an embodiment, with reference to FIG. 25, a supercapacitor 2500 includes niobium yarn 2502 made by twisting together several niobium nanowires 2504 that are processed as described below. The number of nanowires in a yarn generally depends on the average diameter of the nanowires and the diameter of the yarn. In general, the diameter of the yarn 2502 can be selected from a range 10 μm to 1 mm, and nanowires having a diameter in the range 20 nm to 200 nm can be used to form the yarn. The length of the yarn 2502 can be selected from a range 1 μm to 100 m.

A portion of each nanowire 2504 is oxidized to form an outer surface thereof a layer of niobium pentoxide 2506. The nanowire 2504 is then infiltrated or coated with a conductive polymer such as PEDOT, poly pyrrole, and/or poly aniline, forming a cathode 2508. The conductive polymer can be electrodeposited on the nanowire 2504. Alternatively, the nanowire 2504, having a layer 2506 of niobium pentoxide, is coated with a liquid metal such as indium, gallium, or tin to form the cathode 2508. The nanowire 2504 forms the anode. In some embodiments, the anode 2504 may be oxidized to form niobium oxide, and then, a portion of the oxidized niobium wire is further oxidized for form the niobium dielectric layer 2504.

In various embodiments, the diameter of a nanowire 2504 and thickness of niobium pentoxide can be selected according to a desired operating voltage of the supercapacitor 2500. In particular, the dielectric breakdown of Nb pentoxide is approximately 400 V/μm. Therefore, for an operating voltage of 40 V, the Nb pentoxide layer of a thickness of approximately 100 nm and a Nb nanowire of diameter of approximately 240 nm are selected. Similarly, if the desired operating voltage is approximately 20 V, a 50 nm thick Nb pentoxide layer may be formed. For an operating voltage of 3 V, a 7.5 nm thick Nb pentoxide layer is needed. The supercapacitors described above with reference to FIGS. 21-24, that do not include a Nb pentoxide dielectric layer can be operated at voltages up to 3V, e.g., at operating voltages 2.8V, 2.5V, 2.2V, 1.8V, 1.5V, 1V, 0.5V, etc.

Various embodiments and electrical analysis thereof demonstrates that niobium nanowire electrodes can achieve performance levels similar to carbon nanotube and graphene-based devices. The high conductivity of niobium, its good mechanical properties and, its high surface capacitance make this metal a viable alternative to carbons. The high tensile strength and better volumetric capacitance relative to CNT-based supercapacitors make Nb NW based supercapacitors particularly suitable for use in wearable devices.

Due to the fast charging capabilities of the Nb NW based capacitors, they can be used in circuits where high current pulses are required. For demonstration purposes, one 36 mF supercapacitor was made with bare Nb nanowires (with ionic liquid electrolyte) and was used to store energy from a solar cell every 10 seconds and then release it to a 30 mW FM transmitter with minimum operating voltage of 2.5 V. Due to the flexibility of the electrodes, these devices can be integrated into systems without imposing significant design or dimension constraints.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are described in a particular order, this should not be understood as requiring that such operations be performed in that order only or in a sequential manner, or that all described operations be performed, to achieve desirable results. In general, substantially, about, or approximately in connection with a parameter means within a small percentage (e.g., within 0.2%, 0.5%, 1%, 2%, 5%, 10%, etc.) of a specified value of the parameter.

Thus, particular embodiments of the subject matter have been described. Other embodiments are within the scope of the following claims. In some cases, the actions recited in the claims can be performed in a different order and still achieve desirable results.

What is claimed is:

1. A supercapacitor comprising:
 a niobium yarn comprising a plurality of niobium nanowires, each niobium nanowire comprising at least three sections, wherein:
 a first section comprises at least one of unoxidized niobium and niobium oxide;
 a second section comprises a niobium pentoxide layer; and
 a third section comprises a layer formed by coating the niobium nanowire in at least one of a conductive polymer and a liquid metal.

2. The supercapacitor of claim 1, wherein the liquid metal comprises at least one of indium, gallium, and tin.

3. The supercapacitor of claim 1, wherein:
 a diameter of the niobium nanowire is selected from a range of 20 nm to 200 nm; and
 a thickness of the second section is selected from a range of 7.5 nm up to 100 nm.

4. The supercapacitor of claim 1, wherein a diameter of the niobium nanowire and a thickness of the second section are selected according to a specified operating voltage.

5. A method of constructing a supercapacitor, the method comprising the steps of:
 for each one of a plurality of niobium nanowires:
 oxidizing a portion of a niobium nanowire, thereby forming a dielectric layer of niobium pentoxide disposed on an anode portion of the niobium nanowire, the anode portion comprising at least one of unoxidized niobium and niobium oxide; and coating the niobium wire having the anode and the dielectric layer with at least one of a conductive polymer and a liquid metal, thereby forming a cathode; and forming a niobium yarn by grouping the niobium wires together, each wire having an anode, a dielectric layer, and a cathode, to form the supercapacitor comprising the niobium yarn.

6. The method of claim 5, wherein the liquid metal comprises at least one of indium, gallium, and tin.

7. The method of claim 5, wherein: (i) a diameter of each niobium nanowire is selected from a range of 20 nm to 250 nm; and (ii) oxidizing is controlled such that a thickness of the dielectric layer is within a range of 7.5 nm up to 100 nm.

8. The method of claim 5, further comprising:

selecting a diameter of each niobium nanowire and a thickness of each dielectric layer to facilitate operation of the supercapacitor at a specified operating voltage.

\* \* \* \* \*